United States Patent
Shibata

(10) Patent No.: US 7,171,076 B2
(45) Date of Patent: Jan. 30, 2007

(54) DISPERSION-SLOPE COMPENSATOR

(75) Inventor: Kohei Shibata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/235,213

(22) Filed: Sep. 27, 2005

(65) Prior Publication Data

US 2006/0013530 A1    Jan. 19, 2006

Related U.S. Application Data

(63) Continuation of application No. PCT/JP03/05799, filed on May 8, 2003.

(51) Int. Cl.
*G02B 6/26* (2006.01)
*G02B 6/42* (2006.01)

(52) U.S. Cl. .................... 385/32; 385/27; 398/147; 398/159

(58) Field of Classification Search ............ 398/81, 398/147, 159; 385/24, 27, 32
See application file for complete search history.

(56) References Cited

U.S. PATENT DOCUMENTS

| 5,247,382 | A  |   | 9/1993  | Suzuki ............... 398/201 |
| 5,268,738 | A  | * | 12/1993 | Baney et al. ........ 356/479 |
| 5,647,032 | A  | * | 7/1997  | Jutamulia ............ 385/14 |
| 6,289,151 | B1 |   | 9/2001  | Kazarinov et al. ..... 385/32 |
| 6,389,203 | B1 | * | 5/2002  | Jordan et al. ........ 385/50 |
| 6,760,521 | B2 | * | 7/2004  | Watanabe ............ 385/50 |
| 6,766,083 | B2 | * | 7/2004  | Bona et al. .......... 385/40 |

FOREIGN PATENT DOCUMENTS

| CA | 2 281 486   | 4/2000 |
| EP | 0 475 640 A2 | 3/1992 |
| EP | 0 997 751 A2 | 5/2000 |

OTHER PUBLICATIONS

International Search Report dated Jun. 17, 2003 in corresponding PCT Patent Application No. PCT/JP03/05799.
Patent Abstracts of Japan, Publication No. 04-109722 Published Apr. 10, 1992.
Patent Abstracts of Japan, Publication No. 2000-151513 Published May 30, 2000.

* cited by examiner

*Primary Examiner*—Sung Pak
*Assistant Examiner*—Daniel Petkovsek
(74) *Attorney, Agent, or Firm*—Staas & Halsey LLP

(57) ABSTRACT

A dispersion-slope compensator including a feedback-type optical filter constituted by a looped optical line; an input-and-output optical line which inputs and outputs optical signals; and optical couplers which couples the looped optical line and the input-and-output optical line at two or more positions so that a Mach-Zehnder interferometer is formed by a portion of the looped optical line and a portion of the input-and-output optical line which are located between two of the optical couplers. A portion of the optical path realizing an MZI arm which constitutes the Mach-Zehnder interferometer is spatially separated from the other portions of the optical path so that the optical length of the MZI arm can be variably adjusted, and an amount of compensation for dispersion slope can be variably set.

12 Claims, 26 Drawing Sheets

DISPERSION-SLOPE COMPENSATOR

CROSS-REFERENCE TO RELATED APPLICATIONS

This application is a continuing application, filed under 35 U.S.C. Section 111(a), of International Application PCT/JP2003/005799, filed May 8, 2003.

BACKGROUND OF THE INVENTION

1) Field of the Invention

The present invention relates to a dispersion-slope compensator which compensates for dispersion slope, i.e., wavelength dependence of chromatic dispersion.

2) Description of the Related Art

The optical communication networks can be a core to form a base of a communication network, and it is desired that the services of the optical communication networks become available in wider areas and further sophisticated. In particular, development of the WDM (Wavelength Division Multiplex) technique which constitutes a core technology for constructing optical communication systems is rapidly proceeding. The WDM is a technique in which a plurality of signals are concurrently transmitted through a single optical fiber by multiplexing light having different wavelengths.

Since the transmission velocity of light through an optical fiber is different depending on the wavelength of the light, the deformation (broadening) of light pulses caused by chromatic dispersion increases with the transmission distance. The chromatic dispersion can be defined as a difference between the times taken for monochromatic light of two wavelengths 1 nm apart to propagate for 1 km, and is expressed in ps/nm/km. For example, in the case where light with the wavelength around 1.55 micrometers propagates through a single mode fiber (SMF), the chromatic dispersion is 15 to 16 ps/nm/km.

When broadening of a light pulse is caused by chromatic dispersion in a WDM system, which realizes a large-capacity, long-distance optical transmission, the reception level seriously deteriorates, and the deterioration of the reception level adversely affects the system. Therefore, it is necessary to compensate for dispersion so as to substantially eliminate the chromatic dispersion occurring in the optical fiber by adding a chromatic dispersion which is equal in the magnitude and opposite in the polarity to the chromatic dispersion to be eliminated.

Currently, the most frequently used means of compensating for dispersion is the dispersion compensating fiber (DCF), which is designed to cause an opposite structural dispersion to the material dispersion of the fiber material used for forming the SMF by realizing a specific distribution of the refraction index. Since the SMF has positive dispersion, the DCF is normally designed to have negative dispersion.

Conventionally, in the case where dispersion in a WDM system is compensated for by using a DCF, a DCF which compensates for chromatic dispersion in a central channel in the WDM system is connected to an SMF for compensating for chromatic dispersion in optical signals around the central channel, and the residual dispersion (portions of the chromatic dispersion which are not compensated for by the DCF are compensated for by using dispersion compensators provided in a receiver station.

For example, in the case where forty wavelengths are multiplexed in the WDM system, a DCF which compensates for chromatic dispersion in optical signals in the twentieth channel (as the central channel) is connected, and dispersion compensators are provided in a receiver station for compensating residual dispersion.

A typical one of the dispersion compensators is the chirped fiber Bragg grating (CFBG). The CFBG is an optical fiber in which a diffraction grating is realized in the core of the optical fiber by forming periodic variations of the refraction index in the core. Wavelength components of light inputted into the CFBG are differently delayed when the light propagates through the CFBG, so that both of the positive and negative chromatic dispersions can be compensated for. The CFBG is used in combination with an optical circulator or the like.

Further, in a conventional technique for compensating for dispersion which is disclosed, for example, in Japanese Unexamined Patent Publication No. 2000-151513 (Paragraph Nos. <0052> to <0059> and FIG. 9) corresponding to U.S. Pat. No. 6,289,151 (from column 9, line 10, to column 10, line 2, FIGS. 9A and 9B), desired phase responses are applied to inputted optical pulses by using a coupled-type ring resonator as an all-pass optical filter so as to compensate for dispersion.

However, in the aforementioned conventional system in which dispersion is compensated for by using the DCF, the dispersion compensators for compensating for the residual dispersion are required to be provided for the respective channels. Therefore, a great number of dispersion compensators of a great number of different types are necessary, and thus it is impossible to economically construct a WDM system with such a great number of dispersion compensators.

The causes of the residual dispersion are considered below.

In order to consider the characteristics of the chromatic dispersion, the wavelength dependence of the chromatic dispersion, which is called dispersion slope and expressed in $ps/km/nm^2$, is important as well as the amount of chromatic dispersion.

In order to compensate for dispersion, the dispersion slope over the entire wavelength range of signal light is also required to be compensated for as well as the amount of dispersion. However, since the DCF and the SMF have different dispersion slopes, the portions of chromatic dispersion which cannot be compensated for remain in near-end regions of a wavelength band used in the WDM transmission (for example, the so-called C band, which extends from about 1,525 nm to 1,565 nm). Therefore, the residual dispersion accumulatively increases with the transmission distance, and it is necessary to compensate for the residual dispersion for each channel on the receiver side.

FIG. 24 is a graph illustrating a residual dispersion. In FIG. 24, the abscissa corresponds to the wavelength (nm), and the ordinate corresponds to the chromatic dispersion (ps/nm). FIG. 24 shows the residual dispersion in a WDM signal in which forty waves in channels ch1 to ch40 are multiplexed.

When a WDM signal in which the forty waves in channels ch1 to ch40 are multiplexed in the C band with channel spacings of 100 GHz is transmitted through an SMF for 10 km, and undergoes dispersion compensation realized by a DCF which is designed for the central channel ch20 to have a dispersion slope of 0.2 $ps/km/nm^2$, the residual dispersion is approximately +20 (ps/nm) in the channel ch1, and approximately −30 (ps/nm) in the channel ch40 although the residual dispersion in the channel ch20 is eliminated.

FIG. 25 is a diagram illustrating a conventional WDM system. In FIG. 25, only the configuration for one-way transmission is indicated. The WDM system 100 illustrated in FIG. 25 multiplexes at most forty waves, and comprises stations 110 and 120 and repeater amplifiers 130-1 to 130-6. In addition, the optical fibers used in the transmission line are SMFs, and dispersion compensation filters (DCFs) f1 to f6 are arranged in the repeaters. Each of the DCFs f1 to f6 is coiled, contained in a small package, and arranged in one of the repeaters as an optical component.

The station 110 comprises optical transmitters 111-1 to 111-40, a wavelength multiplexer 112, and a WDM amplifier 113, and the station 120 comprises optical receivers 121-1 to 121-40, a wavelength demultiplexer 122, and dispersion compensation modules (DCMs) 123-1 to 123-40.

In the station 110, the optical transmitters 111-1 to 111-40 respectively output optical signals in the channels ch1 to ch40, the wavelength multiplexer 112 multiplexes the optical signals in the channels ch1 to ch40 and generates a WDM signal, and the WDM amplifier 113 amplifies the WDM signal and outputs the WDM signal onto the transmission line.

The repeater amplifiers 130-1 to 130-6 amplify and relay the WDM signal transmitted through the SMFs, and the DCFs f1 to f6 cause dispersion which compensates for the dispersion occurring in the channel ch20. When the optical signals in the channels ch1 to ch40 pass through each of the DCFs f1 to f6, the chromatic dispersion occurring in the preceding SMF is eliminated.

In the station 120, the wavelength demultiplexer 122 demultiplexes the WDM signal into the forty optical signals in the channels ch1 to ch40, and the DCMs 123-1 to 123-40 arranged in correspondence with the channels ch1 to ch40 compensate for the residual dispersion in the channels ch1 to ch40, respectively. The optical receivers 121-1 to 121-40 performs reception processing of the optical signals after the residual dispersion is compensated for.

FIG. 26 is a dispersion map for the WDM system 100 illustrated in FIG. 25. The dispersion map M1 illustrated in FIG. 26 indicates that the positive dispersion occurring in the channel ch20 through the SMF is compensated for by the negative dispersion caused by the DCF in each repeater section. Therefore, the dispersion in the channel ch20 is eliminated in each repeater section, and the dispersions in the channels adjacent to the channel ch20 are also within a certain dispersion tolerance.

However, since it is impossible to completely compensate for the dispersions occurring in the outermost channels ch1 and ch40 located at the ends of the wavelength range by the optical transmission line which is designed for dispersion management of the channel ch20, the residual dispersions in the outermost channels ch1 and ch40 greatly go out of the dispersion tolerance. Therefore, it is necessary to provide in the station 120 a DCF for each channel in which the residual dispersion goes out of the dispersion tolerance. Thus, in the system illustrated in FIG. 25, the DCMs 123-1 to 123-40 are provided for all the channels ch1 to ch40.

When the transmission rate increases, for example, from 10 Gb/s to 40 Gb/s, the dispersion tolerance decreases, i.e., the aperture in the eye pattern becomes smaller. Since the waveshapes of the optical signals received by the optical receivers 121-1 to 121-40 deteriorate, and the possibility of erroneously determining the signal values (i.e., the symbol error rate) increases, high-precision dispersion compensation is required when the transmission rate increases.

As explained above, since the DCFs and the dispersion compensators for the respective channels are arranged for dispersion compensation, the equipment size increases, and construction of an economical network is difficult. In addition, the greatness in the number and the number of types of dispersion compensators imposes heavy loads on the designer of the dispersion management system.

On the other hand, since the aforementioned CFBG is a dispersion compensator for a single channel, it is impossible to compensate for the residual dispersions in all the channels by one operation. Further, since the range of controllable amounts of dispersion slope is small according to the aforementioned technique disclosed in Japanese Unexamined Patent Publication No. 2000-151513 by C. K. Madsen et al., it is impossible to arbitrarily set the amount of compensation for the dispersion slope. Therefore, the technique by C. K. Madsen et al. cannot be applied to the DWDM (Dense-WDM) systems performing transmission with a high transmission rate such as 40 Gb/s or a further higher transmission rate on the order of a petabit per second. Thus, it is difficult to expect further development of this technique for construction of next-generation multimedia networks.

SUMMARY OF THE INVENTION

The present invention is made in view of the above problems, and the object of the present invention is to provide a dispersion-slope compensator which allows setting of the amount of compensation for dispersion slope in a sufficiently great range, and compensates for dispersion slope with high precision for improving the quality of optical transmission.

In order to accomplish the above object, a dispersion-slope compensator for compensating for dispersion slope which optical signals have is provided. The dispersion-slope compensator comprises: a looped optical line which constitutes a feedback-type optical filter; an input-and-output optical line which constitutes the feedback-type optical filter, and is arranged for inputting and outputting the optical signals; and optical couplers which constitutes the feedback-type optical filter, and couples the looped optical line and the input-and-output optical line at two or more positions so that a Mach-Zehnder interferometer is formed by a first portion of the looped optical line and a portion of the input-and-output optical line which are located between two of the optical couplers. In addition, a portion of an optical path realizing an MZI arm which constitutes the Mach-Zehnder interferometer is spatially separated from the other portions of the optical path so that the optical length of the MZI arm can be variably adjusted, and an amount of compensation for the dispersion slope which the optical signals have can be variably set.

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

Preferred embodiments of the present invention will be explained below with reference to the accompanying drawings, wherein like reference numbers refer to like elements throughout.

PRINCIPLE OF THE INVENTION

Figure 1:
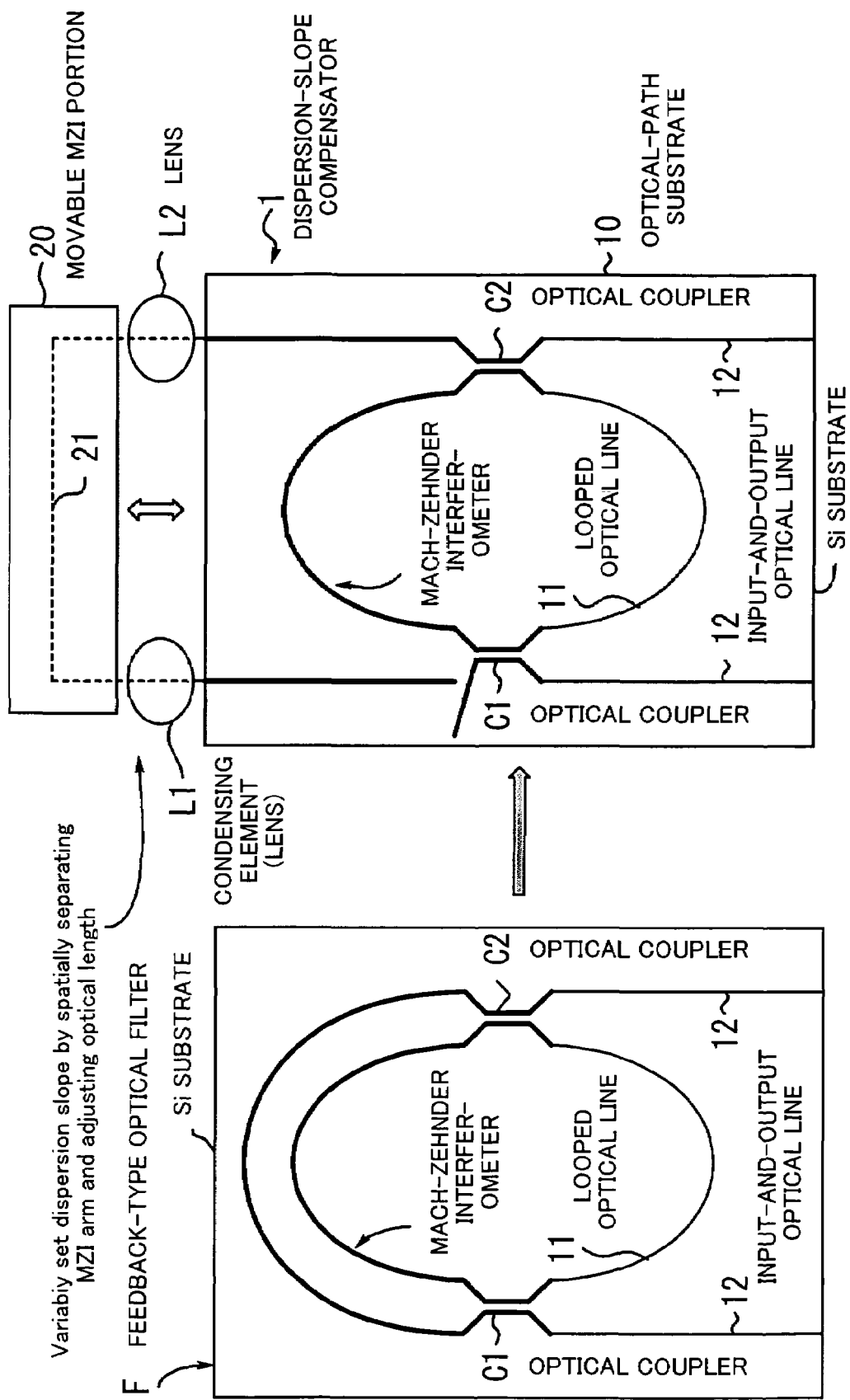
FIG. 1 is a diagram illustrating the principle of the dispersion-slope compensator according to the present invention.

FIG. 1 is a diagram illustrating the principle of the dispersion-slope compensator according to the present invention. The dispersion-slope compensator 1 illustrated in the right half of FIG. 1 is a device for compensating for a dispersion slope in a chromatic dispersion occurring during transmission of an optical signal, and has a construction in which an optical arm constituting a Mach-Zehnder interferometer (MZI) formed in a feedback-type optical filter F is spatially separated from the other portions of the optical arm.

The feedback-type optical filter F is constituted by a looped optical line 11, an input-and-output optical line 12, and optical couplers C1 and C2. The input-and-output optical line 12 inputs and outputs optical signals. The optical couplers C1 and C2 couple the looped optical line 11 and the input-and-output optical line 12 at two or more positions so that the above MZI is constituted by a portion of the looped optical line 11 and a portion of the input-and-output optical line 12 which are located between the optical couplers C1 and C2. For example, the feedback-type optical filter F is formed on a Si substrate.

Then, a portion of the optical arm constituting the MZI is spatially separated from the other portions of the optical arm. Hereinafter, the portion of the optical arm spatially separated from the other portions of the optical arm is referred to as a movable MZI portion 20, and the substrate on which the looped optical line 11 is formed is referred to as an optical-path substrate 10.

The dispersion slope can be variably set by variably adjusting the optical length of the optical path 21 which constitutes the MZI and is located outside the optical-path substrate 10. That is, the movable MZI portion 20 is distanced from the optical-path substrate 10 by moving the movable MZI portion 20 in a mechanical manner. Details of the construction and operations of the present invention are explained later with reference to FIGS. 9 to 23.

Hereinbelow, the other matters related to the dispersion-slope compensator 1 are explained in detail step by step from the design concept of the dispersion slope compensation to the problems overcome by the present invention.

The all-pass optical filter is a filter used for allowing optical signals at all frequencies, and changing only the phases of the optical signals. In the field of optical transmission, the all-pass optical filter is used for dispersion compensation. The all-pass optical filters having a periodic characteristic depending on the wavelength are roughly divided into the FIR (Finite Impulse Response) type and the IIR (Infinite Impulse Response) type.

The FIR filters feedforward-control the frequency responses. The PLC (Planar Lightwave Circuit) type dispersion compensator is a typical one of the FIR type dispersion compensation filters. The PLC type dispersion compensator is constituted by a plurality of MZIs connected in series on a planar waveguide substrate. For example, it is possible to realize dispersion compensation with a negative dispersion by arranging the MZIs in such a manner that optical signals at shorter wavelengths propagate through longer arms, and optical signals at longer wavelengths propagate through shorter arms.

The frequency response of the PLC type dispersion compensator is stable. However, if a steep frequency response is desired, it is necessary to increase the number of the MZIs. Nevertheless, since the chip size increases with the number of the MZIs, the PLC type dispersion compensator having a steep frequency response is not suitable for mass production.

On the other hand, the IIR filters are also called rational filters, and contain a feedback loop. Therefore, instability which does not occur in the FIR filters occurs in the IIR filters due to the feedback loop. However, in the case where the pole in the frequency (wavelength) response of a transfer function representing an IIR filter is located within an appropriate range, the system can be stabilized. In this case, it is possible to obtain a steep frequency response with a small number of circuit elements, and realize a dispersion compensator of a small size. Specifically, when a pole k as a value at which the denominator of the transfer function of the IIR filter is zero is within a unit circle (i.e., satisfies $|k|<1$), the system is stable.

Figure 2:
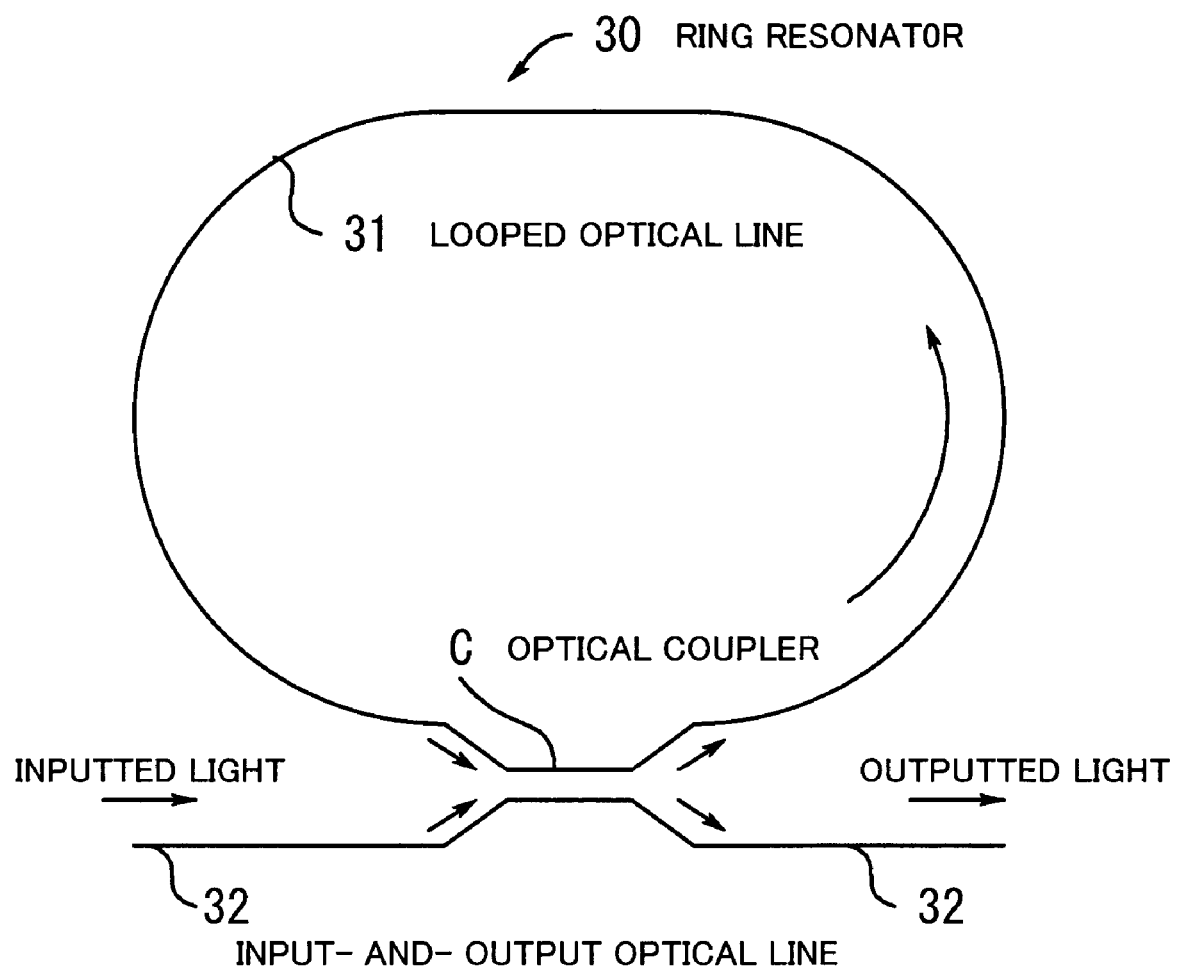
FIG. 2 is a diagram illustrating a ring resonator.

The simplest IIR filter is the ring resonator. FIG. 2 is a diagram illustrating a ring resonator. The ring resonator 30 illustrated in FIG. 2 comprises a looped optical line 31, an input-and-output optical line 32, and an optical coupler C, which optically couples the looped optical line 31 and the input-and-output optical line 32. The dispersion-slope compensator 1 according to the present invention has the ring resonator 30 as its base structure.

The three main design parameters used in designing of the dispersion compensator by use of the ring resonator 30 are the free spectral range (FSR), the position of the central wavelength, and the amount of dispersion compensation. The FSR is the spacing between resonance peaks, i.e., the frequency spacing between adjacent resonance peaks. Specifically, determination of the FSR and the position of the central wavelength relates to designing of the loop length of the ring resonator 30, and the branch ratio in the optical coupler C relates to determination of the amount of dispersion compensation, as explained below by using the transfer function of the ring resonator 30.

The ITU-T Grid stipulates the spacings between adjacent frequencies (wavelengths) in the WDM systems. For example, the spacings of the ITU-T grid are 100 GHz (0.8 nm) or 50 GHz (0.4 nm). In the WDM systems, wavelengths are required to be accurately on the ITU-T grid, the spacings of which are small. The above central wavelength is a wavelength used as a reference when the wavelengths in a WDM system are determined in correspondence with the ITU-T grid.

Figure 3:
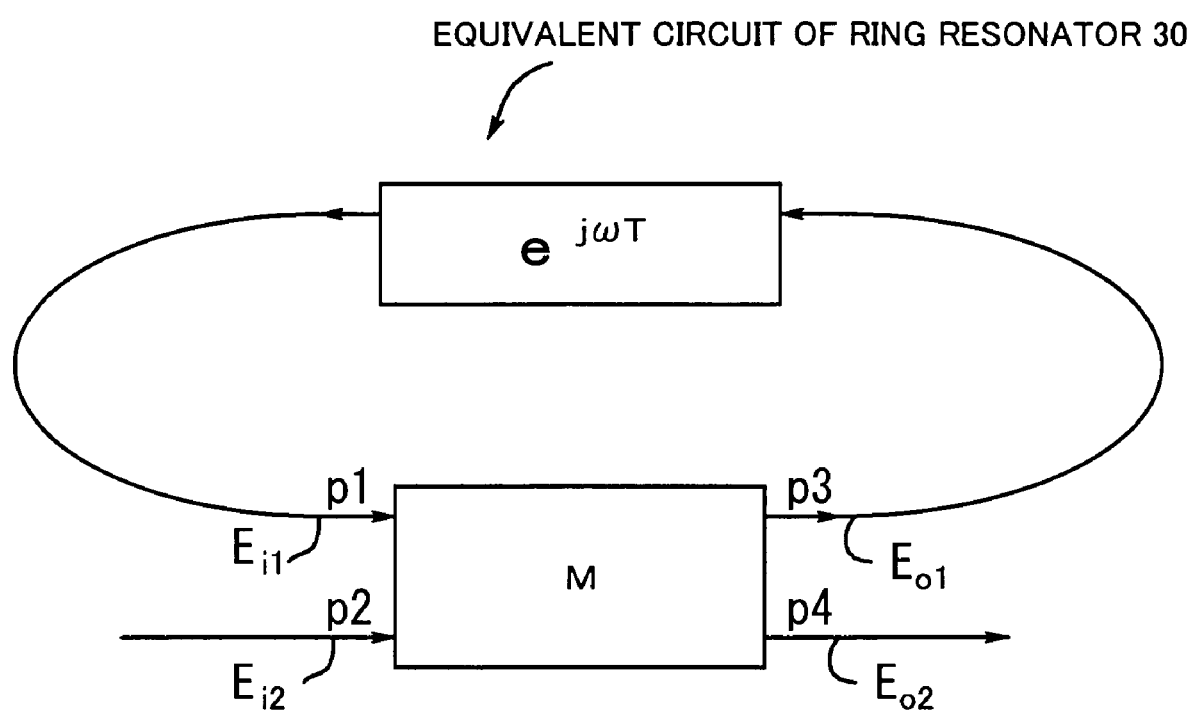
FIG. 3 is a diagram illustrating an equivalent circuit of the ring resonator.

The ring resonator 30 can be expressed by an equivalent circuit as illustrated in FIG. 3. In FIG. 3, the four-terminal circuit M corresponds to the optical coupler C, and the delay element $\exp(j\omega T)$ corresponds to the looped optical line 31. In the four-terminal circuit M, the input signals into the ports p1 and p2 are respectively denoted by $E_{i1}$ and $E_{i2}$, and the output signals from the ports p3 and p4 are respectively denoted by $E_{o1}$ and $E_{o2}$.

When the transfer matrix m of the optical coupler C (i.e., the four-terminal circuit M) is expressed by $$m = \begin{pmatrix} m_{11} & m_{12} \\ m_{21} & m_{22} \end{pmatrix},$$

the input signals and the output signals have the relationship, $$\begin{pmatrix} m_{11} & m_{12} \\ m_{21} & m_{22} \end{pmatrix}\begin{pmatrix} E_{i1} \\ E_{i2} \end{pmatrix} = \begin{pmatrix} E_{o1} \\ E_{o2} \end{pmatrix}. \tag{1}$$

The transfer matrix m in the equation (1) can also be expressed as $$m = \begin{pmatrix} m_{11} & m_{12} \\ m_{21} & m_{22} \end{pmatrix} = \begin{pmatrix} \cos\theta & -\sin\theta \\ \sin\theta & +\cos\theta \end{pmatrix}. \tag{2}$$

That is, $m_{11}m_{22}-m_{12}m_{21}=1$, i.e., the determinant of the transfer matrix m is one.

On the other hand, since the input signal $E_{i1}$ and the output signal $E_{o1}$ have the relationship, $$E_{i1}=E_{o1}\exp(j\omega T),$$

the phase shift $h(\lambda)$ occurring in the looped optical line 31 is expressed by the following equation (3), where $L_r$ is the loop length of the looped optical line 31, n is the effective refraction index of the waveguide, $\lambda$ is the input wavelength, and the minus signs in the exponents indicates phase delays.

$$\begin{aligned} h(\lambda) &= \frac{E_{i1}}{E_{o1}} \\ &= \exp(-j\omega T) \\ &= \exp\left(-j \cdot 2\pi f \cdot \frac{L_r}{c}\right) \\ &= \exp\left(-j \cdot 2\pi \frac{c}{\lambda'} \cdot \frac{L_r}{c}\right) \\ &= \exp\left(-j \cdot 2\pi \frac{c}{\lambda/n} \cdot \frac{L_r}{c}\right) \\ &= \exp(-j \cdot 2\pi L_r \cdot n/\lambda) \end{aligned} \tag{3}$$

Next, the transfer function $H(\lambda)$ of the ring resonator 30 is derived as indicated in the equations (4) from the equation (1) and the conditions $\det(m)=1$ and $h(\lambda)=E_{i1}/E_{o1}$, where $m_{11}$, $m_{12}$, $m_{21}$, and $m_{22}$ are respectively denoted by a, b, c, and d.

$$\begin{aligned} H(\lambda) &= \frac{E_{o2}}{E_{i2}} \\ &= \frac{cE_{i1}+dE_{i2}}{E_{i2}} \\ &= \frac{bcE_{i1}+bdE_{i2}}{bE_{i2}} \end{aligned} \tag{4}$$

-continued $$= \frac{adE_{i1} + bcE_{i1} - adE_{i1} + bdE_{i2}}{bE_{i2}}$$

$$= \frac{d(aE_{i1} + bE_{i2}) - (ad - bc)E_{i1}}{bE_{i2}}$$

$$= \frac{dE_{o1} - \det E_{i1}}{bE_{i2}}$$

$$= \frac{E_{i1} - dE_{o1}}{E_{o1} - bE_{i2} - E_{o1}}$$

$$= \frac{E_{i1} - dE_{o1}}{aE_{i1} - E_{o1}}$$

$$= \frac{E_{i1}/E_{o1} - d}{a(E_{i1}/E_{o1}) - 1}$$

$$= \frac{h(\lambda) - m_{22}}{m_{11}h(\lambda) - 1}$$

In addition, since $m_{22}$ is the complex conjugate of $m_{11}$, i.e., $m_{22}=m_{11}^*$, the equation (4) can be written as the equation (5).

$$H(\lambda) = \frac{h(\lambda) - m_{22}}{m_{11}h(\lambda) - 1} \quad (5)$$

$$= \frac{h(\lambda) - m_{11}^*}{m_{11}h(\lambda) - 1}$$

Next, the group delay $D(\lambda)$ is obtained by differentiating the argument (the phase) $\arg(H(\lambda))$ of the transfer function $H(\lambda)$ with respect to the angular frequency $\omega$, where $\omega=2\pi c/\lambda$, and c is the velocity of the light. The group delay is the time necessary for an optical signal to propagate through an optical transmission line. Specifically, first, the angular frequency $\omega$ is differentiated with respect to the wavelength $\lambda$, and the equations (6) are obtained.

$$\frac{d\omega}{d\lambda} = -\frac{2\pi c}{\lambda^2} \leftrightarrow \frac{d\lambda}{d\omega} = -\frac{\lambda^2}{2\pi c} \quad (6)$$

The group delay $D(\lambda)$ can be expressed by the equation (7) by using the equations (6).

$$D(\lambda) = \frac{d(\arg(H(\lambda)))}{d\omega} \quad (7)$$

$$= \frac{d\lambda}{d\omega} \cdot \frac{d(\arg(H(\lambda)))}{d\lambda}$$

$$= -\frac{\lambda^2}{2\pi c} \cdot \frac{d(\arg(H(\lambda)))}{d\lambda}$$

Further, the chromatic dispersion $DS(\lambda)$ is obtained by differentiating the group delay $D(\lambda)$ with respect to the wavelength $\lambda$ as indicated in the equation (8), since the change in the group delay corresponding to a change in the wavelength $\lambda$ is the chromatic dispersion.

$$DS(\lambda) = \frac{d}{d\lambda}D(\lambda) \quad (8)$$

Next, the FSR is calculated. The FSR is determined by using a change in the wavelength $\lambda$ which is equal to $L_r n/m$ corresponding to a change in the integer m, where $1 \ll m$. The wavelength $\lambda$ and the adjacent wavelength $\lambda'$ are related with $L_r n$ and the integer m as indicated in the equation (9).

$$L_r \cdot n = m \cdot \lambda = (m+1) \cdot \lambda' \quad (9)$$

When $1 \ll m$, the relationship between the wavelength difference $\Delta\lambda$ and the integer m can be expressed as the equation (10) by using the equation (9).

$$\Delta\lambda = \lambda' - \lambda \quad (10)$$

$$= \frac{m}{m+1}\lambda - \lambda$$

$$= -\frac{\lambda}{(m+1)}$$

$$\approx -\frac{\lambda}{m}$$

$$\leftrightarrow -\frac{\Delta\lambda}{\lambda}$$

$$= \frac{1}{m}$$

At this time, the FSR, which is the frequency spacing between channels and denoted below by $\Delta f$, can be expressed as the equation (11) by differentiating both sides of the equation $f=c/\lambda$ with respect to $\lambda$.

$$FSR = \Delta f \quad (11)$$

$$= -\frac{c}{\lambda^2}\Delta\lambda$$

$$= \frac{c}{\lambda}\left(-\frac{\Delta\lambda}{\lambda}\right)$$

When the equations (9) and (10) are substituted into the equation (11), the FSR is expressed as the equation (12).

$$FSR = \frac{c}{\lambda}\left(-\frac{\Delta\lambda}{\lambda}\right) \quad (12)$$

$$= \frac{c}{m \cdot \lambda}$$

$$= \frac{c}{L_r \cdot n}$$

The equation (12) shows that the FSR is determined by designing of the loop length $L_r$. In addition, the central wavelength is determined by determining which wavelength $\lambda$ to be set equal to $L_r n(\lambda)/m$, where m is an integer. Due to the periodicity, It is possible to set the central wavelength by adjusting the loop length $L_r$ within the range from $-0.5l$ to $+0.5l$.

On the other hand, the amount of dispersion compensation is obtained as follows.

When $m_{11}=0$, the branch ratio in the optical coupler C is 100%. In this case, the entire signal flow which enters the optical coupler C (the four-terminal circuit M) through the port p2 is outputted from the optical coupler C through the port p3, and then circulates through the looped optical line 31. Thereafter, the entire signal flow enters the optical coupler C (the four-terminal circuit M) through the port p1, and is outputted from the optical coupler C through the port p4. At this time, the equation (5) becomes H(λ)=−h(λ), and therefore arg(H(λ))=−arg(h(λ)). In addition, since arg(h(λ)) =−2πL$_r$n/λ as indicated in the equation (3), when m$_{11}$=0, the equation (7) expressing the group delay can be written as the equation (13).

$$D(\lambda) = -\frac{\lambda^2}{2\pi c} \cdot \frac{d(\arg(H(\lambda)))}{d\lambda} \quad (13)$$
$$= \frac{\lambda^2}{2\pi c} \cdot \frac{d(\arg(h(\lambda)))}{d\lambda}$$
$$= \frac{\lambda^2}{2\pi c} \cdot \frac{d}{d\lambda}\left(\frac{-2\pi L_r n}{\lambda}\right)$$
$$= \frac{\lambda^2}{2\pi c} \cdot \left(\frac{2\pi L_r n}{\lambda^2}\right)$$
$$= \frac{L_r n}{c}$$

Since the equation (13) shows that the group delay is a constant, the differentiation of the right side of the equation (13) with respect to the wavelength λ, i.e., the chromatic dispersion, is zero. On the other hand, when the value m$_{11}$ is increased within the range between zero and one (i.e., when the branch ratio is decreased from 100%), wavelength modulation occurs in the phase of the transfer function H(λ). That is, chromatic dispersion occurs. Since the amount of dispersion varies with the value m$_{11}$, the ring resonator 30 can produce a dispersion slope (which indicates the variations in the amount of dispersion with the wavelength) by changing the value m$_{11}$ (which corresponds to the branch ratio in the optical coupler C) with the wavelength (channel).

Next, a method for changing the value m$_{11}$ according to the wavelength is explained below.

In the method explained below, the coupling portion realized by the optical coupler C is replaced with an MZI, so that a structure corresponding to the feedback-type optical filter F illustrated in the left half of FIG. 1 is realized.

Figure 4:
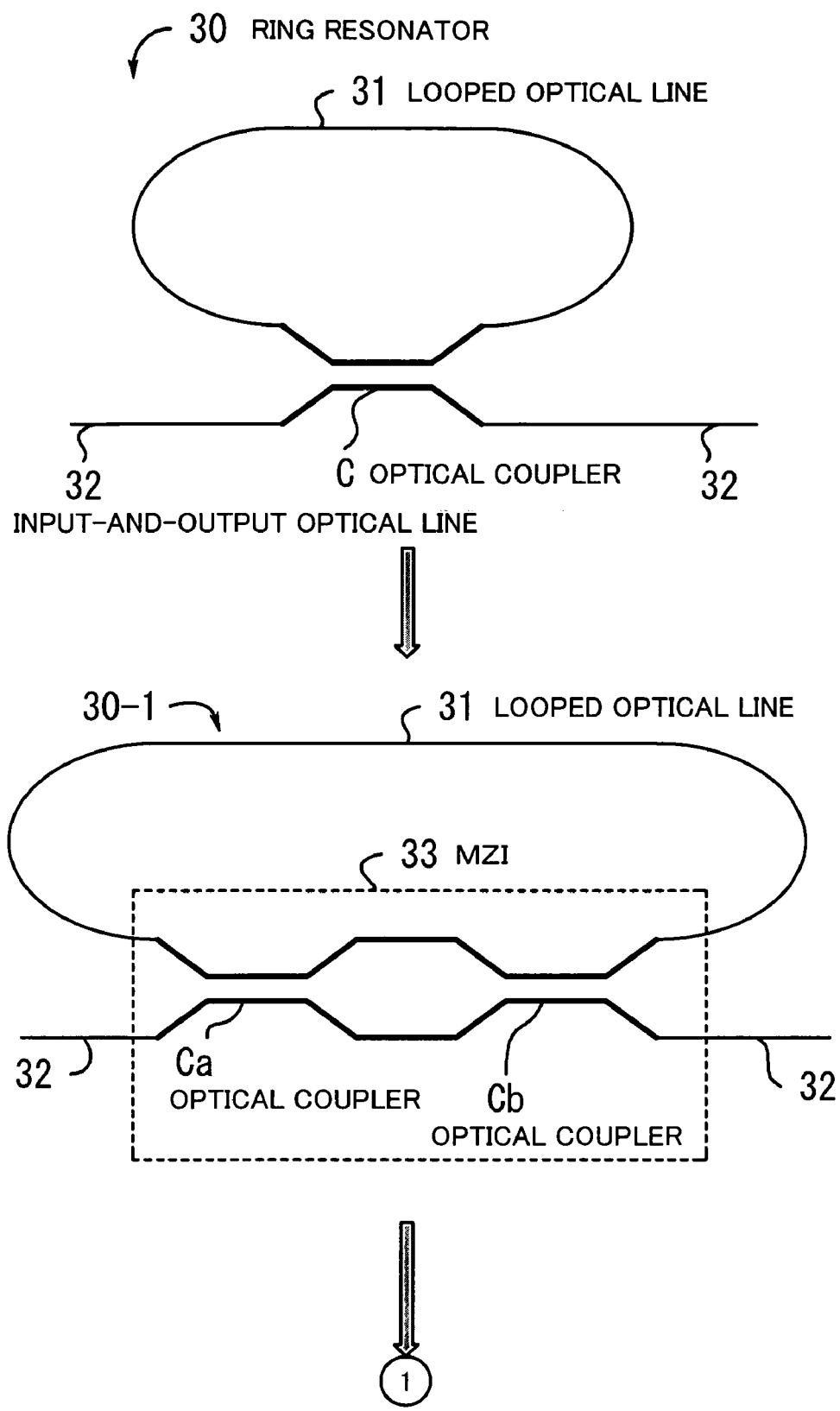
FIG. 4 is a diagram illustrating replacement of an optical coupler with a Mach-Zehnder interferometer (MZI) in a structure of a ring resonator in which a looped optical line is coupled to an input-and-output optical line.
Figure 5:
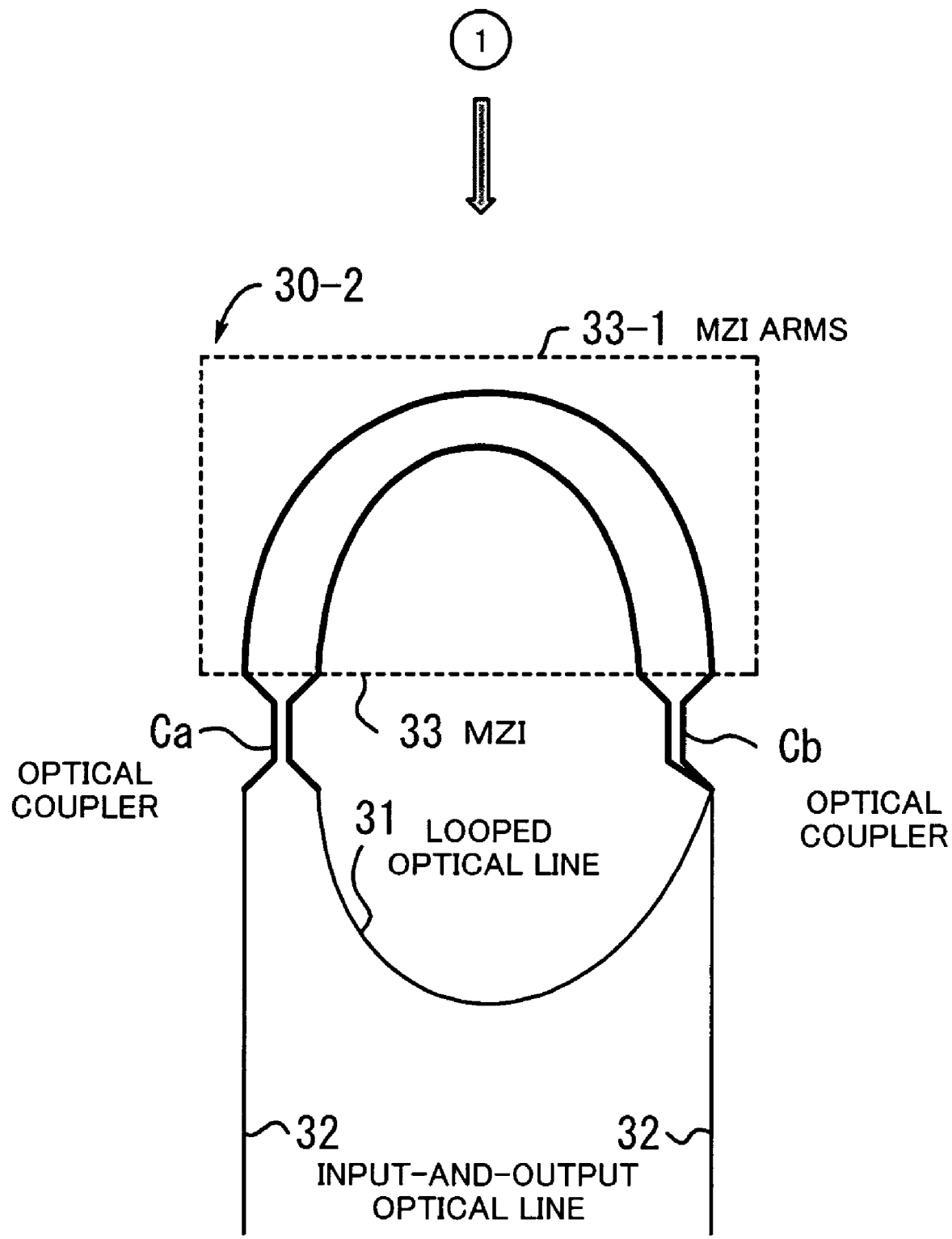
FIG. 5 is a diagram illustrating a structure of a ring resonator in which an optical coupling portion is realized by an MZI.

FIG. 4 is a diagram illustrating replacement of an optical coupler with a Mach-Zehnder interferometer (MZI) in a structure of a ring resonator in which a looped optical line is coupled to an input-and-output optical line, and FIG. 5 is a diagram illustrating a structure of a ring resonator in which the arms of the MZI are elongated.

As illustrated in FIG. 4, in the ring resonator 30 before the replacement, the looped optical line 31 is coupled to the input-and-output optical line 32 through the single optical coupler C. On the other hand, in the ring resonator 30-1 after the replacement, the looped optical line 31 is coupled to the input-and-output optical line 32 through two optical couplers Ca and Cb so that an MZI 33 is formed as indicated by the bold solid lines in the lower half of FIG. 4. Further, in the ring resonator 30-2 illustrated in FIG. 5, the MZI arms 33-1 constituting the MZI 33 are elongated. As explained later, the amount of dispersion slope can be increased by elongating the MZI arms 33-1.

The transfer matrix m(λ) of the MZI 33 can be expressed as $$m(\lambda) = \begin{pmatrix} \cos\theta_2 & -\sin\theta_2 \\ \sin\theta_2 & +\cos\theta_2 \end{pmatrix} \quad (14)$$
$$\begin{pmatrix} \exp(-j\pi\Delta L_m \cdot n/\lambda) & 0 \\ 0 & \exp(j\pi\Delta L_m \cdot n/\lambda) \end{pmatrix} \begin{pmatrix} \cos\theta_1 & -\sin\theta_1 \\ \sin\theta_1 & +\cos\theta_1 \end{pmatrix},$$

where ΔL$_m$ is the difference between the optical lengths of the MZI arms 33-1, θ1 and θ2 are coupler rotations (couplings), n is the effective refraction index of waveguides, and l is the input wavelength.

Thus, the transfer function of the ring resonator 30-2 containing the MZI 33 is obtained by substituting the transfer matrix m of the ring resonator 30 with the transfer matrix m(λ). At this time, the argument of the transfer function arg(H(λ)) is expressed as $$\arg(H(\lambda)) = \arctan\left(\frac{\sin(-2\pi L_r \cdot n/\lambda) - \beta}{\cos(-2\pi L_r \cdot n/\lambda) - \alpha}\right) - \quad (15a)$$
$$\arctan\left(\frac{\alpha\sin(-2\pi L_r \cdot n/\lambda) - \beta\cos(-2\pi L_r \cdot n/\lambda)}{\alpha\cos(-2\pi L_r \cdot n/\lambda) - \beta\sin(-2\pi L_r \cdot n/\lambda)}\right),$$

where $$\alpha = \cos(\pi\Delta L_m \cdot n/\lambda)\cdot\cos(\theta_1 + \theta_2), \text{ and} \quad (15b)$$
$$\beta = \sin(\pi\Delta L_m \cdot n/\lambda)\cdot\cos(\theta_1 - \theta_2). \quad (15c)$$

In the ring resonator 30-2, the wavelength dependence of the element exp(±jπΔL$_m$n/λ) in the transfer matrix m(λ) realizes the wavelength dependence of the value m$_{11}$. That is, when the value ΔL$_m$n is greater, the change in the value m$_{11}$ with the wavelength λ and the dispersion slope increase.

FIGS. 6A to 8C show relationships between the wavelength dependence of the value m$_{11}$ and the group delay in various ring resonators 30a to 30c each having an MZI. The abscissa in each of FIGS. 6B, 6C, 7B, 7C, 8B, and 8C corresponds to the wavelength, the ordinate in each of FIGS. 6B, 7B, and 8B corresponds to the value m$_{11}$ (corresponding to the branch ratio realized by the couplers), and the ordinate in each of FIGS. 6B, 7B, and 8B corresponds to the group delay (ps).

Figure 6A:
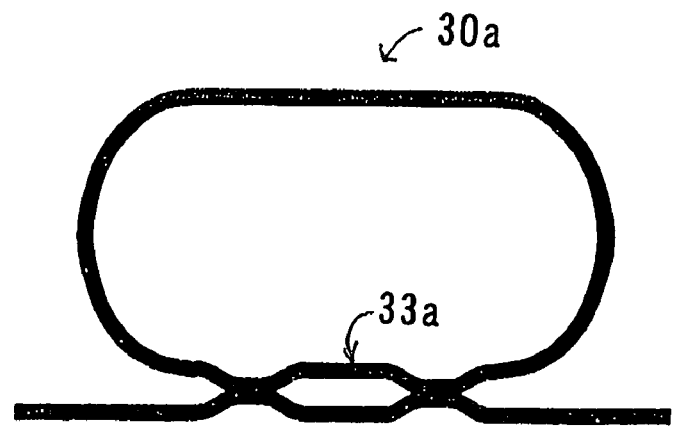
FIG. 6A is a diagram schematically illustrating the structure of a ring resonator 30a in which the difference between the optical lengths of the MZI arms is very small.
Figure 6B:
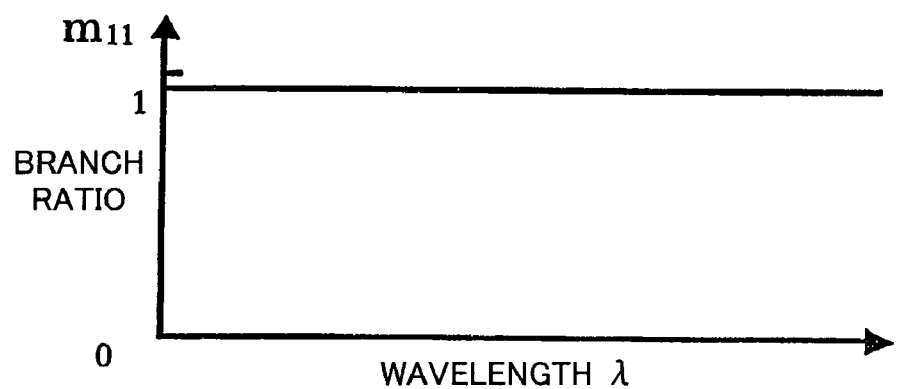
FIG. 6B is a graph schematically indicating a wavelength dependence of $m_{11}$ in the ring resonator 30a of FIG. 6A.
Figure 6C:
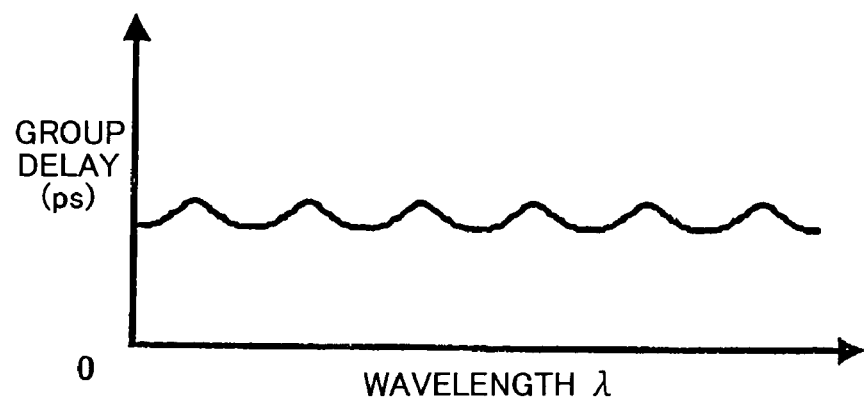
FIG. 6C is a graph schematically indicating a wavelength dependence of the group velocity in the ring resonator 30a of FIG. 6A.

FIG. 6A is a diagram schematically illustrating the structure of a ring resonator 30a having an MZI 33a in which the difference between the optical lengths of the MZI arms is very small. In this case, the value m$_{11}$ is slightly smaller than one as illustrated in FIG. 6B. The variations in the group delay with the wavelength are small, and the amount of dispersion slope is also small, as illustrated in FIG. 6C. (If the value m$_{11}$ is equal to one, the variations in the group delay with the wavelength are zero, and the graph of the group delay becomes a straight line.)

Figure 7A:
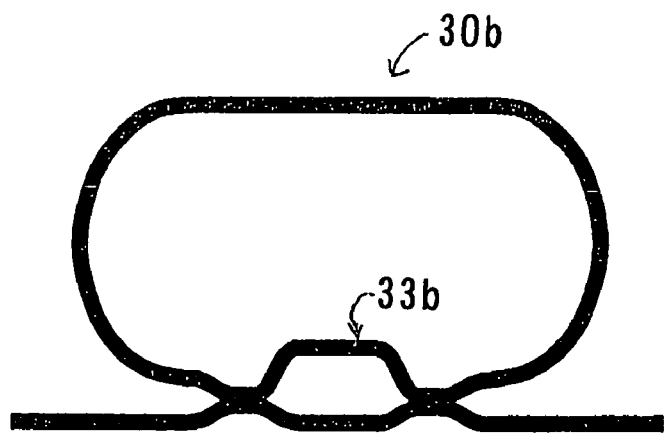
FIG. 7A is a diagram schematically illustrating the structure of a ring resonator 30b in which one of the MZI arms is elongated.
Figure 7B:
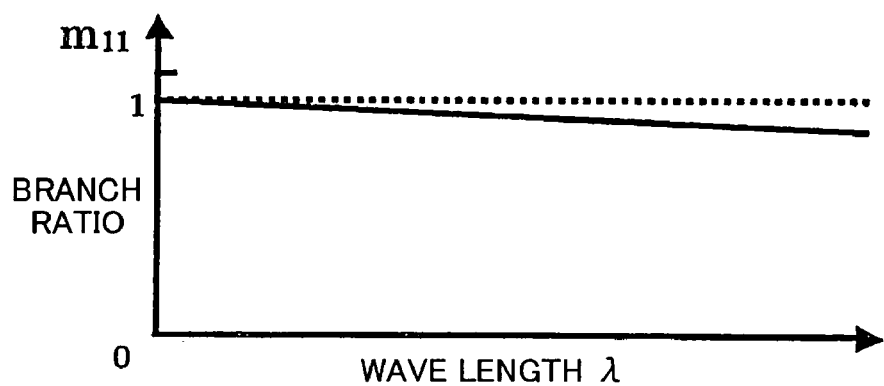
FIG. 7B is a graph schematically indicating a wavelength dependence of $m_{11}$ in the ring resonator 30b of FIG. 7A.
Figure 7C:
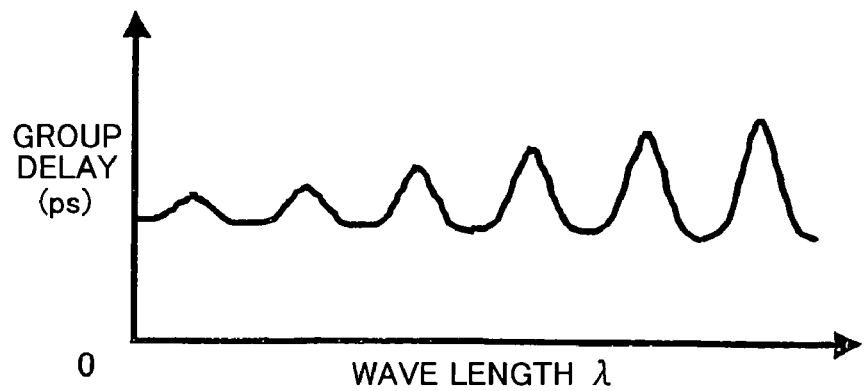
FIG. 7C is a graph schematically indicating a wavelength dependence of the group velocity in the ring resonator 30b of FIG. 7A.

FIG. 7A is a diagram schematically illustrating the structure of a ring resonator 30b having an MZI 33b in which one of the MZI arms is elongated. In this case, as illustrated in FIGS. 7B and 7C, as the value m$_{11}$ (m$_{11}$<1) decreases with the increase in the wavelength as illustrated in FIG. 7B, the variations in the group delay with the wavelength become clearer, and the variations in the dispersion slope increase. The amounts of the dispersion slope correspond to the inclinations of the peaks of the group delay.

Figure 8A:
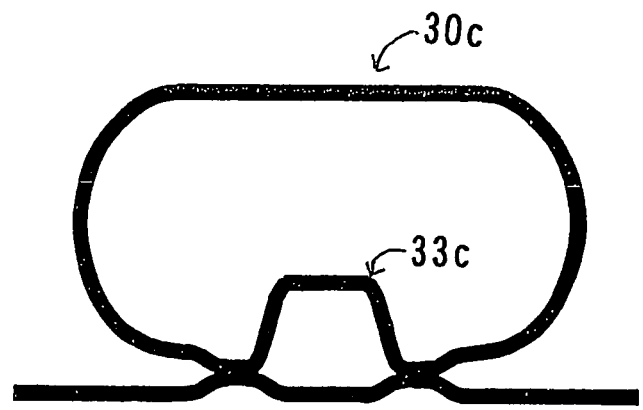
FIG. 8A is a diagram schematically illustrating the structure of a ring resonator 30c in which one of the MZI arms is further elongated.
Figure 8B:
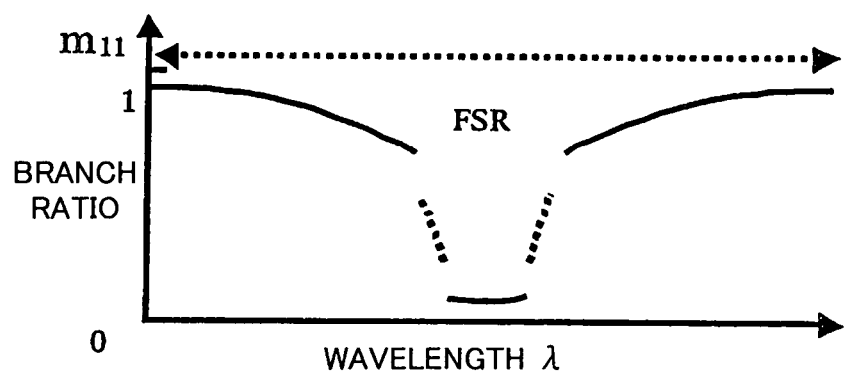
FIG. 8B is a graph schematically indicating a wavelength dependence of $m_{11}$ in the ring resonator 30c of FIG. 8A.
Figure 8C:
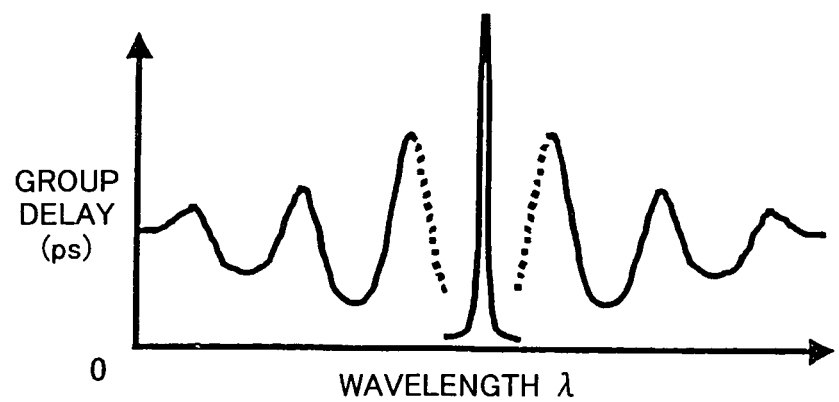
FIG. 8C is a graph schematically indicating a wavelength dependence of the group velocity in the ring resonator 30c of FIG. 8A.

FIG. 8A is a diagram schematically illustrating the structure of a ring resonator 30c having an MZI 33c ink which one of the MZI arms is further elongated. In this case, as illustrated in FIGS. 8B and 8C, when the value m$_{11}$ greatly varies between zero and one, the group delay and the amount of dispersion slope rapidly vary.

In an exemplary case where a desired wavelength range is the C band (in which Δλ≈40 nm), and n≈1.45 (as in the case of a quartz PLC), the value m$_{11}$ can vary from approximately 1 to 0.8 with the wavelength when the value ΔL$_m$ is varied from 0 to tens of micrometers.

Incidentally, in order to variably compensate for dispersion or dispersion slope by using a ring resonator containing an MZI, it is possible to consider use of a dispersion compensator having a monolithic PLC structure and a heater or electrodes which are arranged around the MZI arm for use of the thermo-optic effect (phenomenon) or the electro-optic effect (phenomenon), for example, as disclosed in Japanese Unexamined Patent Publication No. 2000-151513. However, when the dispersion or dispersion slope is controlled as above, the range of controllable amounts of the dispersion slope is small, and therefore it is impossible to arbitrarily set the amount of dispersion slope.

For example, in the case where the thermo-optic effect, which can cause great variations in the refraction index, is used in a silica PLC, the temperature dependence of the refraction index, $\Delta n$, is approximately $10^{-5}$/degrees. If the practical temperature difference $\Delta T$ is assumed to be at most 30 degrees, the length of the heater necessary for changing the optical length by approximately 1.5 micrometers (corresponding to one wavelength $\lambda$ in or near the C band) is approximately 5 mm (corresponding to $\lambda/\Delta T \Delta n$).

Since the branch ratio in the MZI (coupler) portion is varied in the range from 100% to 80% for adjustment of the amount of dispersion, and the range corresponds to the change of approximately 0.3 micrometers (corresponding to $\lambda/5$) in the difference between the optical lengths of the MZI arms, the length of the heater necessary for controlling the amount of dispersion is approximately 1 mm. Therefore, the amount of dispersion can be controlled by using the heater.

On the other hand, the variations of approximately 0 to 20 micrometers are necessary in the difference between the optical lengths of the MZI arms for controlling the amount of dispersion slope. However, when the loop length for signal transmission at the transmission rate of 10 Gb/s or higher, at which dispersion compensation is necessary, is 10 mm (corresponding to the bandwidth of 20 GHz) or smaller, the maximum possible value of the difference between the optical lengths of the MZI arms is 0 to 3 micrometers. Although the dispersion compensators having a monolithic PLC structure can be manufactured for the transmission rate lower than and close to 10 Gb/s and the FSR smaller than and close to 50 GHz, conventionally, it is impossible to realize a dispersion-slope compensator in which the amount of compensation for dispersion slope can be set in a sufficiently great range.

Therefore, according to the present invention, a function of spatially separating a portion of the optical paths which realize the MZI arms, and (mechanically) adjusting the optical length of at least one of the MZI arms is provided, so that the optical length of the portion of the at least one of the MZI arms can be arbitrarily varied as a variation of a distance in the real space, and the period of the wavelength dependence of the coupling ratio at the coupling between the looped optical line 31 and the input-and-output optical line 32 can be set to a desired value according to the system.

Hereinbelow, the constructions and operations of the dispersion-slope compensators according to various embodiments of the present invention are explained in detail.

First Embodiment

The dispersion-slope compensator according to the first embodiment of the present invention is explained below with reference to FIG. 9, which is a diagram illustrating the construction of the dispersion-slope compensator 1-1 according to the first embodiment. The dispersion-slope compensator 1-1 comprises a looped optical line 11, an input-and-output optical line 12, and optical couplers C1 and C2. The optical couplers C1 and C2 couple the looped optical line 11 and the input-and-output optical line 12 so that an MZI is constituted by a portion of the looped optical line 11 and a portion of the input-and-output optical line 12 which are located between the optical couplers C1 and C2. In addition, a portion of an MZI arm br constituting the MZI is spatially separated from the other portions of the MZI arm br.

The above portion of the MZI arm br is formed on a movable MZI portion 20, and the other portions of the dispersion-slope compensator 1-1 are formed on an optical-path substrate 10. In addition, condensing elements L1 and L2, which are realized by collimate lenses, are arranged between the movable MZI portion 20 and the optical-path substrate 10. The condensing elements L1 and L2 collimate light, so that propagation loss in optical signals propagating through the above portion of the MZI arm br is reduced. The movable MZI portion 20 is realized by, for example, a reflection prism.

Figure 9:
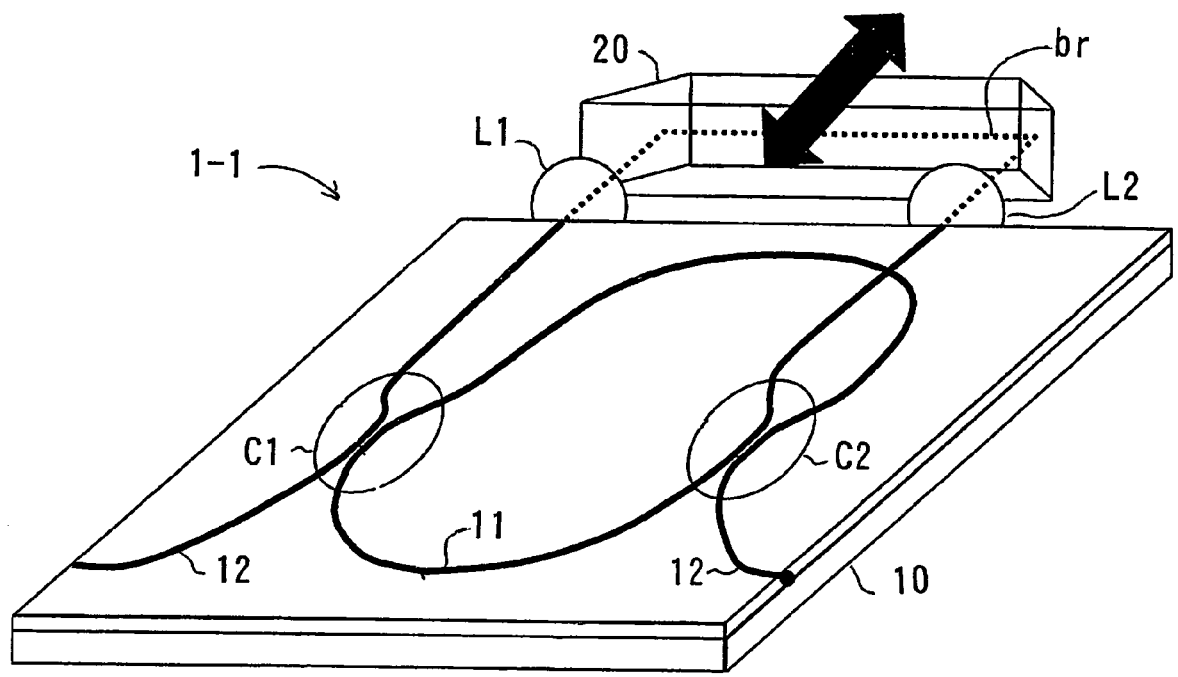
FIG. 9 is a perspective view of the construction of a dispersion-slope compensator according to a first embodiment of the present invention.

In the above construction, the difference $\Delta L_m$ between the optical lengths of the MZI arms can be controlled by moving the movable MZI portion 20 in the directions indicated by the arrows in FIG. 9. Therefore, the amount of dispersion slope can be arbitrarily set by continuously changing the value $m_{11}$, which has a wavelength dependence. Thus, the present invention can overcome the aforementioned problem that the amount of the dispersion slope can be controlled in only a small range by the technique using the thermo-optic effect (phenomenon), the electro-optic effect (phenomenon), the photoelastic effect (phenomenon), or the like.

Alternatively, the function of the portion of the dispersion-slope compensator 1-1 containing the optical couplers C1 and C2 and the input-and-output optical line 12 may be realized by using fiber couplers. Further, the movable MZI portion 20, which is separated from the optical-path substrate 10, may be realized by an optical fiber or a PLC.

Second Embodiment

The dispersion-slope compensator according to the second embodiment of the present invention is explained below with reference to FIG. 10, which is a perspective view of the construction of the dispersion-slope compensator 1-2 according to the second embodiment. The dispersion-slope compensator 1-2 has a basically identical construction to the dispersion-slope compensator 1-1 according to the first embodiment except that the optical-path substrate 10a in the second embodiment (corresponding to the optical-path substrate 10 in the first embodiment) is arranged in such a manner that the lengths of the two MZI arms br1 and br2 constituting the MZI are identical when the movable MZI portion 20 is not distanced from the optical-path substrate 10a.

Figure 10:
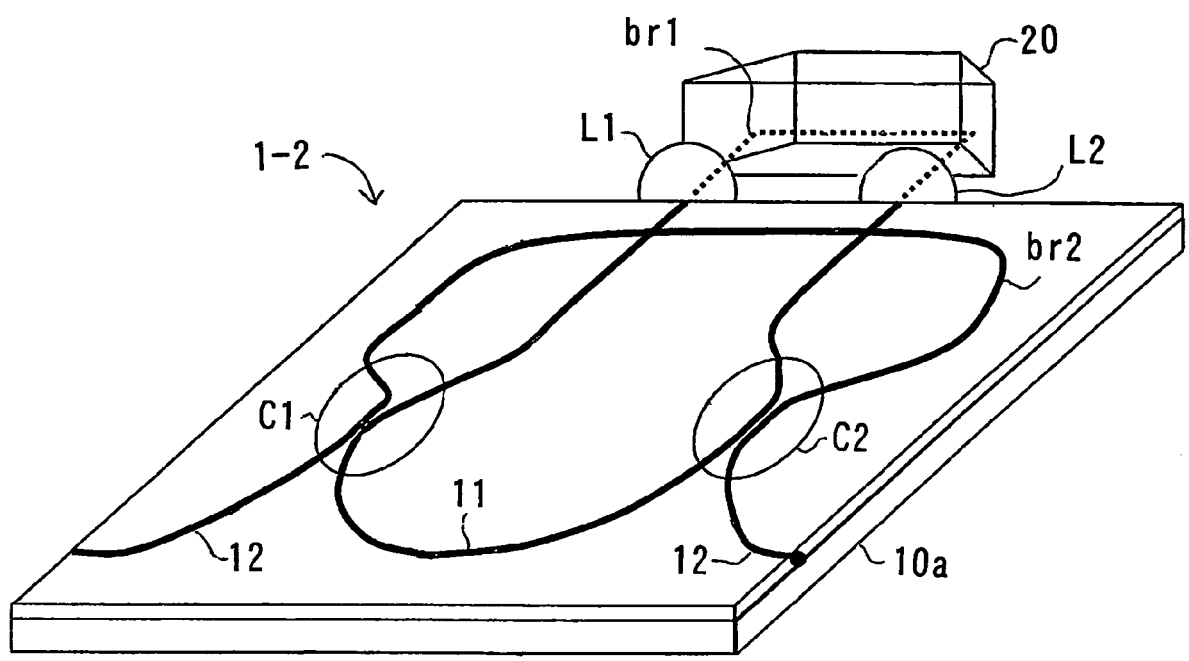
FIG. 10 is a perspective view of the construction of a dispersion-slope compensator according to a second embodiment of the present invention.

Specifically, in the case where the looped optical line 11, the input-and-output optical line 12, and the optical couplers C1 and C2 are arranged on a monolithic PLC as illustrated in FIG. 10, it is possible to equalize the lengths of the two MZI arms br1 and br2 when the movable MZI portion 20 is not distanced from the optical-path substrate 10a. When the movable MZI portion 20 is distanced from the optical-path substrate 10a as illustrated in FIG. 9, the MZI arm br1 which passes through the movable MZI portion 20 becomes longer than the other MZI arm br2.

Since the dispersion-slope compensator 1-2 has the above construction, the difference $\Delta L_m$ between the optical lengths of the MZI arms br1 and br2 becomes zero when the movable MZI portion 20 is not distanced from the optical-path substrate 10a. Therefore, the difference $\Delta L_m$ between the optical lengths of the MZI arms br1 and br2 can be varied from $\Delta L_m$=0 by moving the movable MZI portion 20 so as to increase the distance of the movable MZI portion 20 from the optical-path substrate 10a. Thus, the range in which the difference $\Delta L_m$ between the optical lengths of the MZI arms in the second embodiment can be varied is greater than the range in the first embodiment. That is, the amount of dispersion slope can be variably set in the second embodiment in a wider range than in the first embodiment.

In addition, it is preferable that the branch ratios in the optical couplers C1 and C2 are 50% at the longest or shortest wavelength in the usable wavelength range. In this case, when the difference $\Delta L_m$ between the optical lengths of the MZI arms is zero, the value $m_{11}$ becomes equal to one, and the amount of dispersion becomes zero, at the longest or shortest wavelength. Thus, it is possible to maximize the range within which the amount of dispersion slope can be varied.

Third Embodiment

Figure 11:
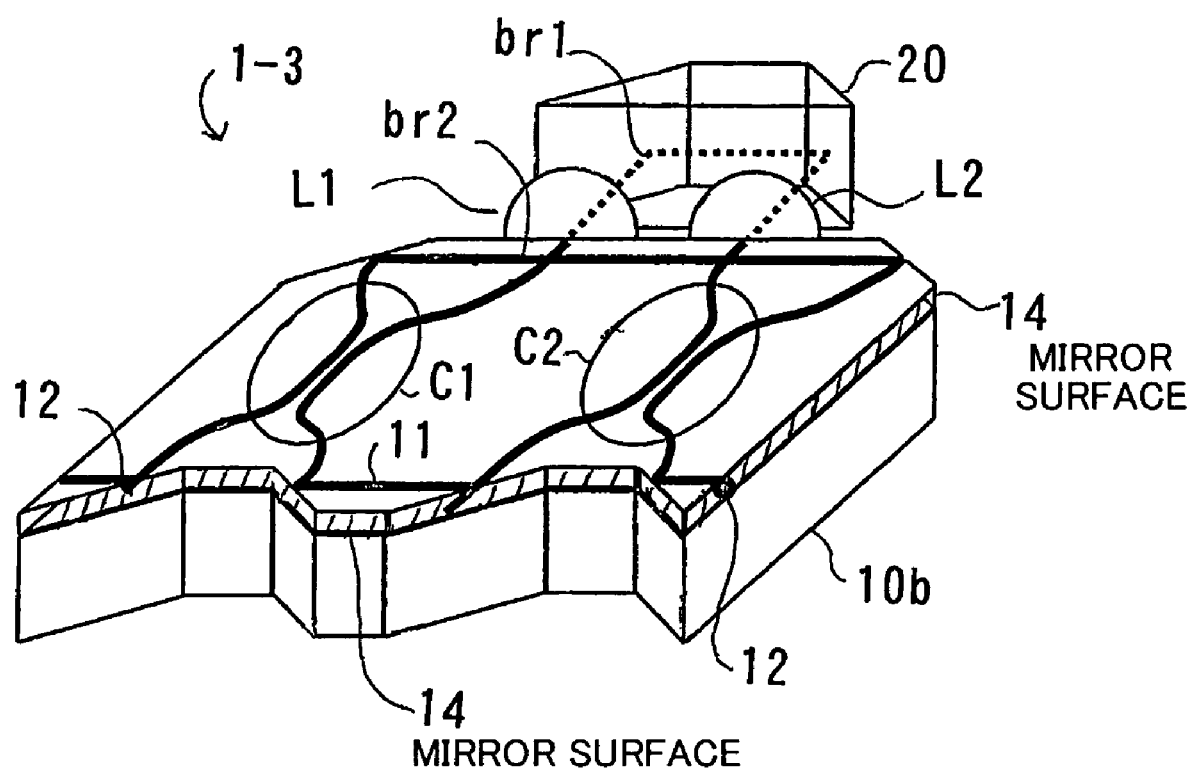
FIG. 11 is a perspective view of the construction of a dispersion-slope compensator according to a third embodiment of the present invention.

The dispersion-slope compensator according to the third embodiment of the present invention is explained below with reference to FIG. 11, which is a perspective view of the construction of the dispersion-slope compensator 1-3 according to the third embodiment. The dispersion-slope compensator 1-3 has a basically identical construction to the dispersion-slope compensator 1-1 according to the first embodiment except for the optical-path substrate 10b in the dispersion-slope compensator 1-3. In the optical-path substrate 10b, light-reflecting elements (mirrors) 14 are arranged at positions at which the optical paths are bent (as indicated by hatching in FIG. 11). When the light-reflecting elements (mirrors) 14 are arranged as above, it is possible to realize greater values of the FSR with reduced insertion loss for the reasons explained below.

In the case where the looped optical line 11, the input-and-output optical line 12, and the optical couplers C1 and C2 are arranged on a monolithic PLC, it is necessary to form a loop with a minimum radius of curvature which is determined on the basis of the difference between the refraction indexes of the core and the cladding.

Figure 12:
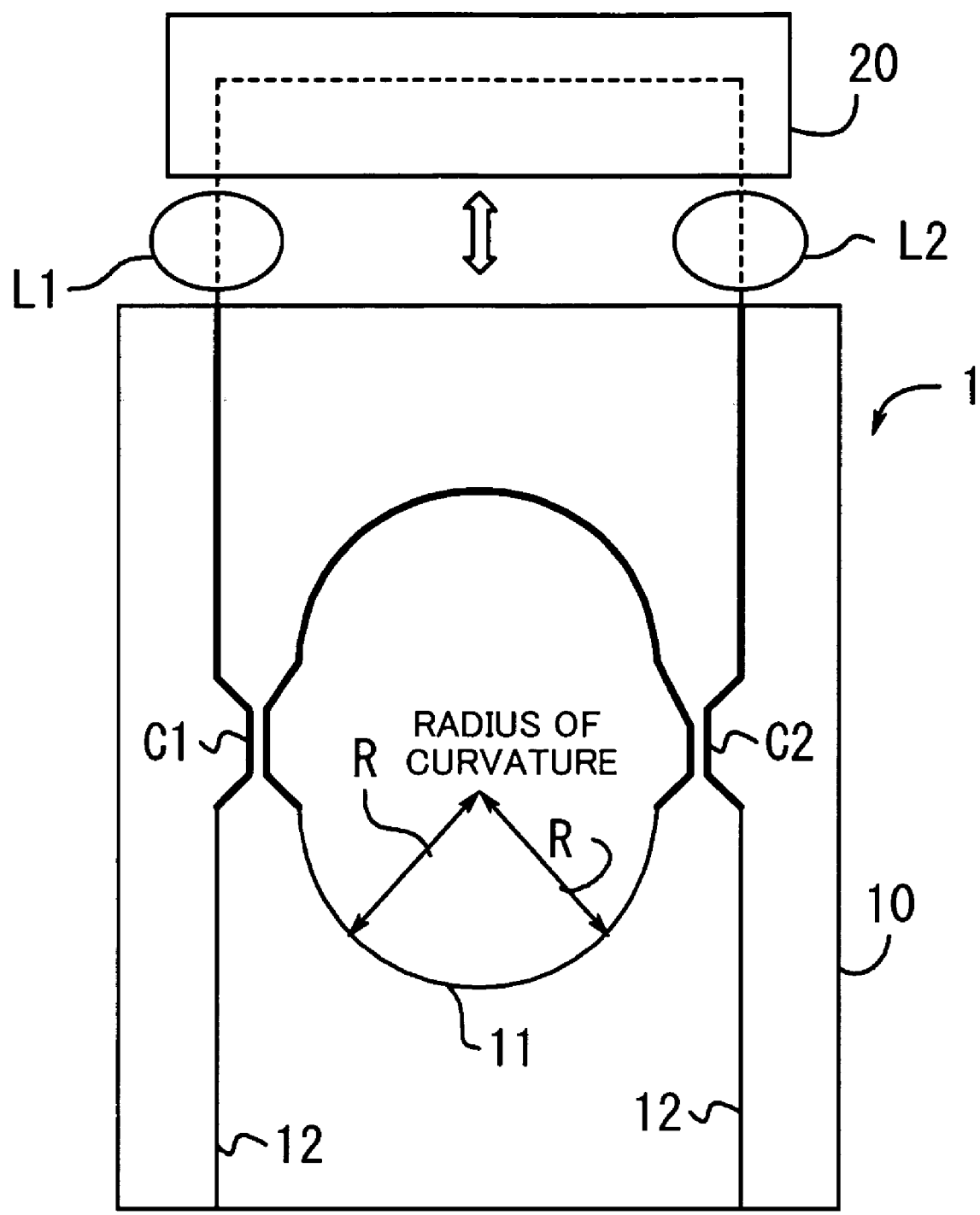
FIG. 12 is a diagram illustrating the radius of curvature of a loop.
Figure 13:
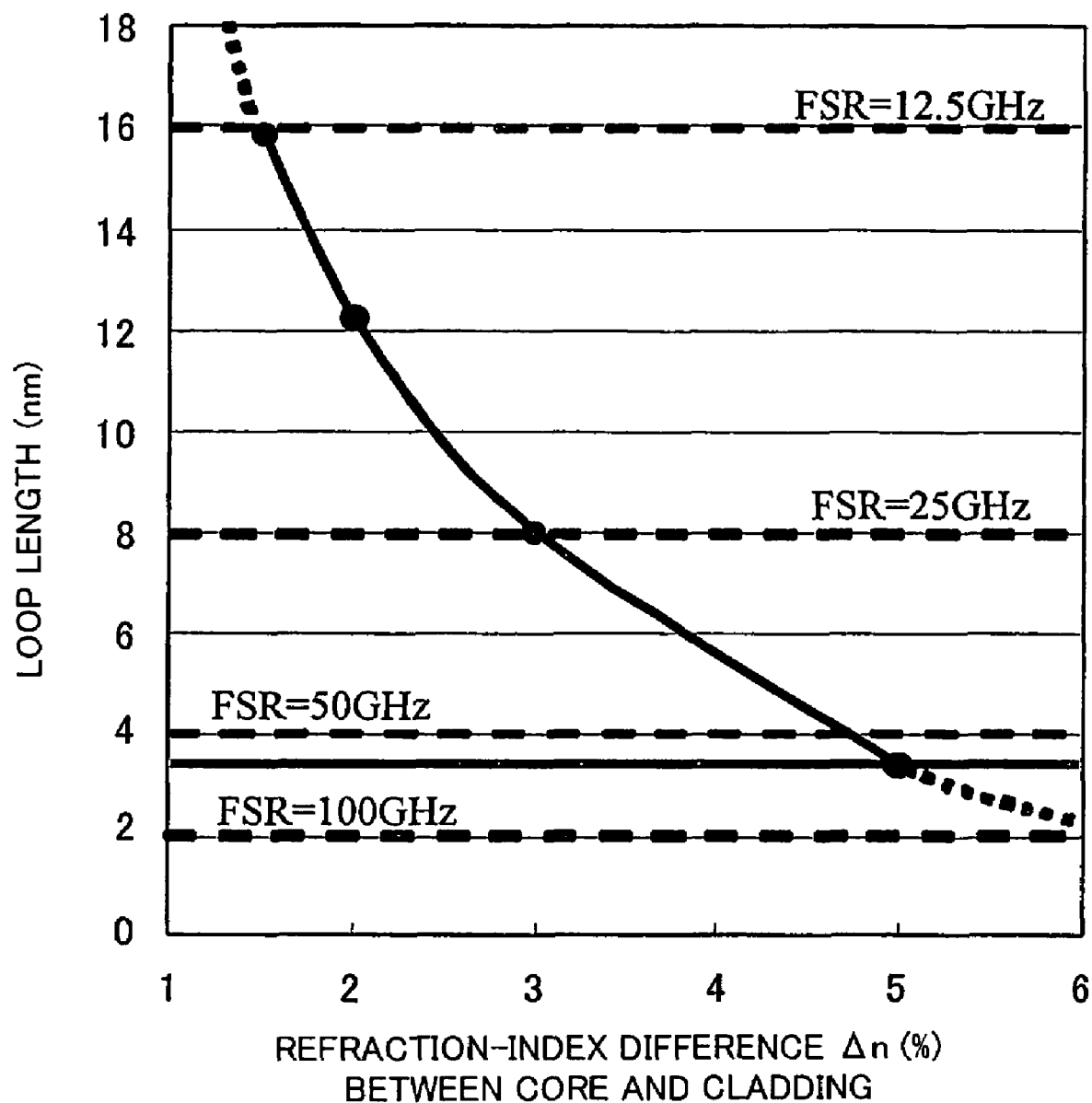
FIG. 13 is a graph indicating a relationship between the difference in the refraction index and the possible loop length.

FIG. 12 is a diagram illustrating the radius of curvature of a loop, and FIG. 13 is a graph indicating a relationship between the difference in the refraction index and the possible loop length. In FIG. 13, the abscissa corresponds to the difference $\Delta n$ (%) in the refraction index between the core and the cladding (which is hereinafter referred to as the refraction-index difference), and the ordinate corresponds to the loop length (nm). FIG. 13 shows that, for example, the refraction-index difference $\Delta n$ of approximately 5% is necessary for realizing the channel spacing of 50 GHz.

When the refraction-index difference in a PLC is great as above, the core diameter is small. Therefore, light propagation is greatly affected by roughness of the core surface produced during formation of the core, and the propagation loss increases. In order to avoid the increase in the propagation loss, the above light-reflecting elements (mirrors) 14 are provided for facilitating a PLC process with a smaller refraction-index difference is made in the third embodiment. That is, according to the third embodiment, the bent portions of the optical paths except for the optical couplers C1 and C2 are formed with the mirrors 14 in order to relax the limit of the radius of curvature. In addition, since the limit of the radius of curvature is relaxed, it is possible to realize the loop length of 2 mm (corresponding to the FSR of 100 GHz) with the refraction-index difference $\Delta n$ of approximately 4%, and therefore the dispersion-slope compensator 1-3 can be used at the transmission rate of 40 Gb/s or higher.

For example, the mirrors 14 can be produced by choosing a blade having a desired bevel angle for a dicing saw used for division into PLC chips, and performing dicing along the directions perpendicular to PLC side surfaces. Further, in order to further reduce the circulation loss through the loop, it is possible to cover the mirrors exposed by the dicing, with high-reflection coatings realized by multilayer dielectric films.

Fourth Embodiment

Figure 14:
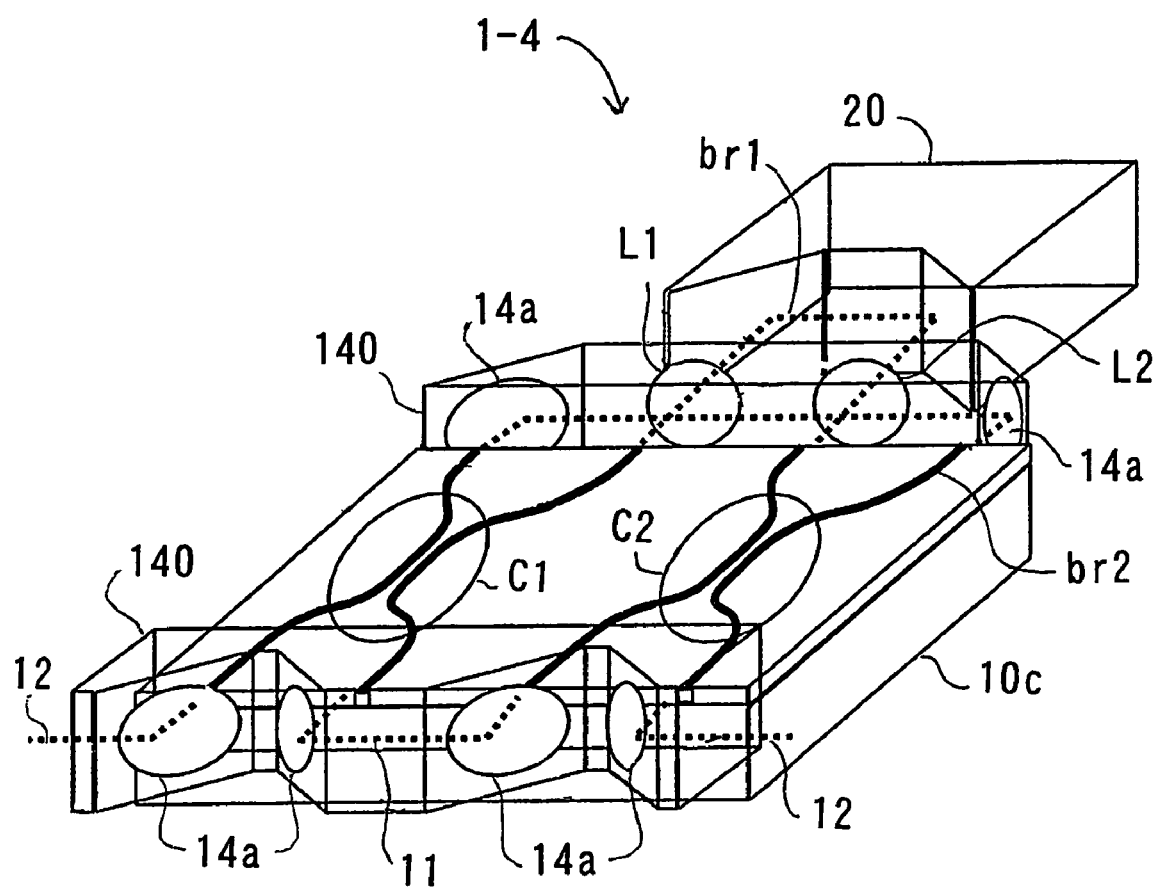
FIG. 14 is a perspective view of the construction of a dispersion-slope compensator according to a fourth embodiment of the present invention.

The dispersion-slope compensator according to the fourth embodiment of the present invention is explained below with reference to FIG. 14, which is a perspective view of the construction of the dispersion-slope compensator 1-4 according to the fourth embodiment. In the dispersion-slope compensator 1-4, molded glass components 140 are adhered to the PLC side surfaces instead of forming mirrors directly on the PLC side surfaces. In addition, the condensing elements L1 and L2 are also realized by the molded glass components 140, so that the insertion loss can be further reduced than the third embodiment.

In the molded glass components 140, the condensing elements L1 and L2 and concave mirrors 14a are integrally formed. The molded glass components 140 are adhered to the PLC with an adhesive having high light transmittance. In addition, in order to reduce the loop circulation loss, it is possible to apply high-reflection coating (realized by multilayer dielectric films) to the light-reflecting surfaces of the reflection elements as in the third embodiment, and apply antireflection coating to the light-transmitting surfaces.

Fifth Embodiment

The dispersion-slope compensator according to the fifth embodiment of the present invention is explained below with reference to FIGS. 15 and 16. According to the fifth embodiment, a PLC having the thermo-optic effect is used for enabling adjustment of the optical length of the looped optical line 11 with the precision of a few micrometers.

In the first to fourth embodiments, variable setting of the dispersion slope is mainly considered. On the other hand, according to the fifth embodiment, the optical length is adjusted by using the thermo-optic effect, so that adjustment of the central wavelength and the amount of dispersion compensation is enabled by varying the central wavelength in a range of several micrometers.

Figure 15:
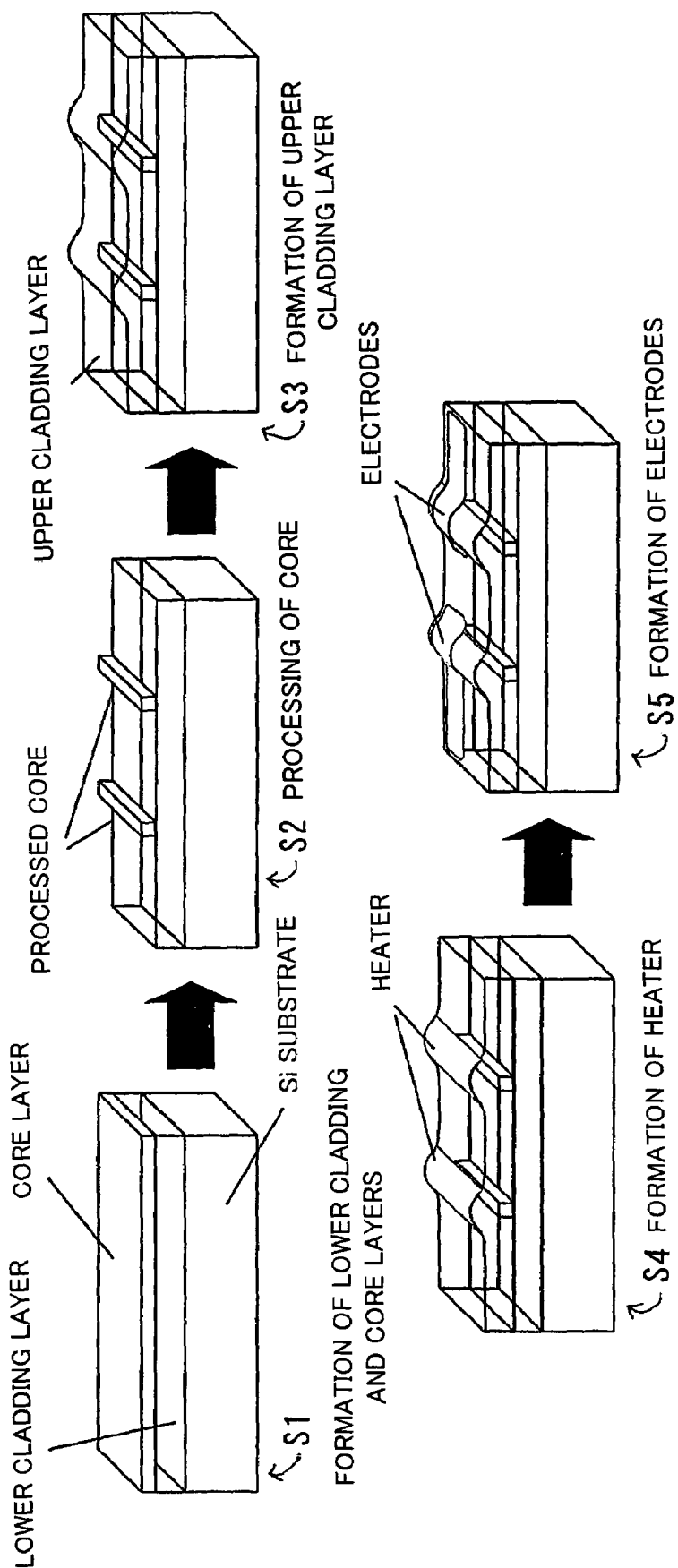
FIG. 15 is a diagram illustrating an example of a process for producing a PLC having the thermo-optic effect.

FIG. 15 is a diagram illustrating an example of a process for producing a PLC having the thermo-optic effect. The process of FIG. 15 is explained below step by step.

<S1> A $SiO_2$ film is formed as a lower cladding layer on a Si or glass substrate by CVD (chemical vapor deposition) or FHD (flame hydrolysis deposition). At this time, it is preferable to add phosphor (P), boron (B), germanium (Ge), or the like to the $SiO_2$ film so as to control the membrane stress or the refraction index.

<S2> A core layer in which light is to propagate is formed by CVD or FHD in a similar manner to the lower cladding layer. At this time, the composition of the core layer is controlled to have a Ge concentration higher than the cladding layers. Alternatively, the composition of core layer is controlled to have a higher refraction index than the cladding layers, for example, by addition of titanium (Ti).

<S3> A mask corresponding to a core pattern including looped portions is formed on the core layer, and the core pattern transfer is performed by dry etching. The mask may be made of a photosensitive organic material or metal. For example, the metal mask can be formed by evaporating a metal such as chromium (Cr), and etching the evaporated metal by use of a mask made of an organic material.

Thereafter, the above mask corresponding to the core pattern is chemically removed, and then the core is embedded by forming an upper cladding layer by CVD or FHD in a similar manner to the lower cladding layer.

Further, the adjustment of the optical length of the looped portions and control of the central wavelength and the amount of dispersion compensation are enabled by heating the entire PLC component formed as above.

<S4 and S5> In the case where the PLC is locally heated, it is necessary to form a heater and electrodes on a surface of the PLC, for example, by using the lift-off technique, in which a mask of a photosensitive organic material is formed on the surface of the PLC by patterning so that only the areas at which the heater and the like are to be formed are not covered by the mask, and materials for the heater and the electrodes are evaporated over the mask. Thereafter, the mask is removed by using an organic solvent or the like.

For example, the heater may be made of platinum (Pt), tungsten (W), nichrome, chromium (Cr), or the like, and the electrodes may be made of gold (Au), copper (Cu), aluminum (Al), or the like. In order to improve the adhesiveness between the above metal and the $SiO_2$ film, it is preferable to form a thin film of a material having a high melting point (such as titanium (Ti)) between the $SiO_2$ film and the materials for the heater or the electrodes.

Figure 16:
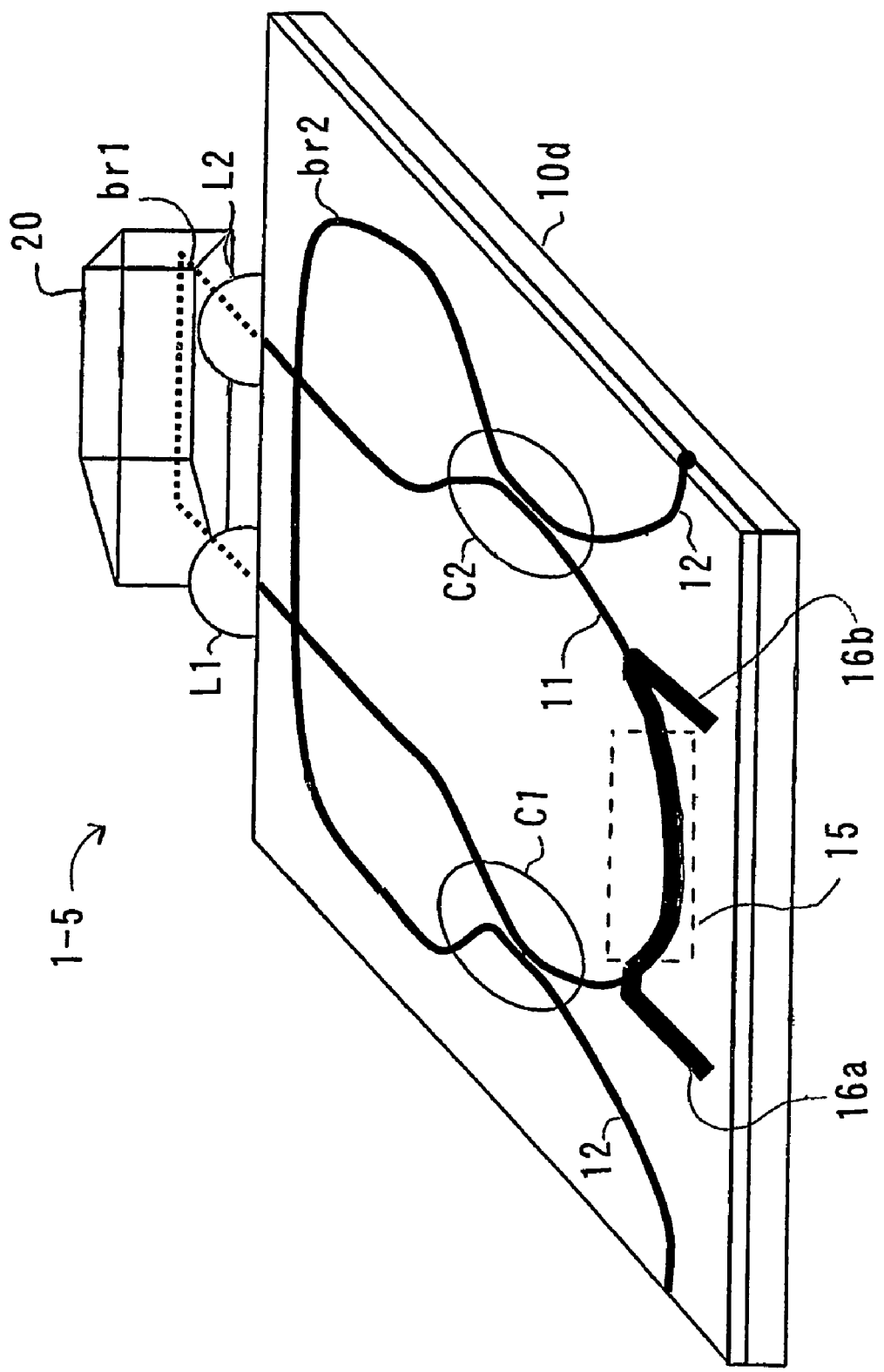
FIG. 16 is a perspective view of the construction of a dispersion-slope compensator according to a fifth embodiment of the present invention.

FIG. 16 is a perspective view of the construction of the dispersion-slope compensator according to the fifth embodiment of the present invention. The dispersion-slope compensator 1-5 illustrated in FIG. 16 has a basically identical construction to the dispersion-slope compensator 1-2 according to the second embodiment except for the optical-path substrate 10d. On the optical-path substrate 10d, a heater 15 and electrodes 16a and 16b for the looped optical line 11 are formed by the procedure of steps S4 and S5.

Sixth Embodiment

Figure 17:
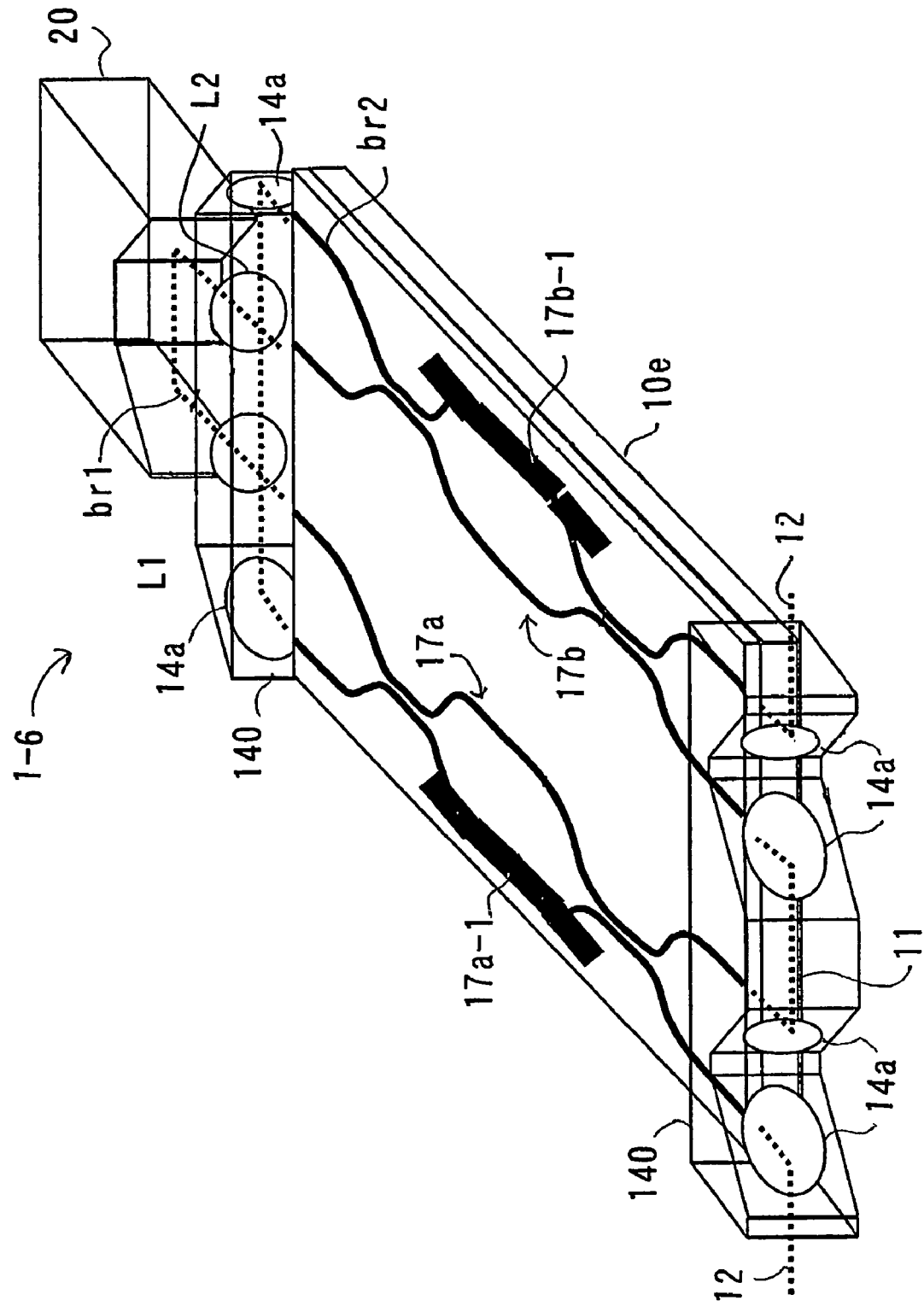
FIG. 17 is a perspective view of the construction of a dispersion-slope compensator according to a sixth embodiment of the present invention.

The dispersion-slope compensator according to the sixth embodiment of the present invention is explained below with reference to FIG. 17, which is a perspective view of the construction of the dispersion-slope compensator 1-6 according to the sixth embodiment. In the dispersion-slope compensator 1-6, the optical couplers C1 and C2 are respectively replaced with the MZIs 17a and 17b, and heaters 17a-1 and 17b-1 are respectively arranged for the MZIs 17a and 17b. The electrodes for the heaters 17a-1 and 17b-1 are not shown in FIG. 17. The provision of the MZIs 17a and 17b and the heaters 17a-1 and 17b-1 enables compensation for dispersion slope together with a predetermined amount of dispersion compensation, i.e., compensation for both of the dispersion per se and the dispersion slope.

Construction of Module

Figure 18:
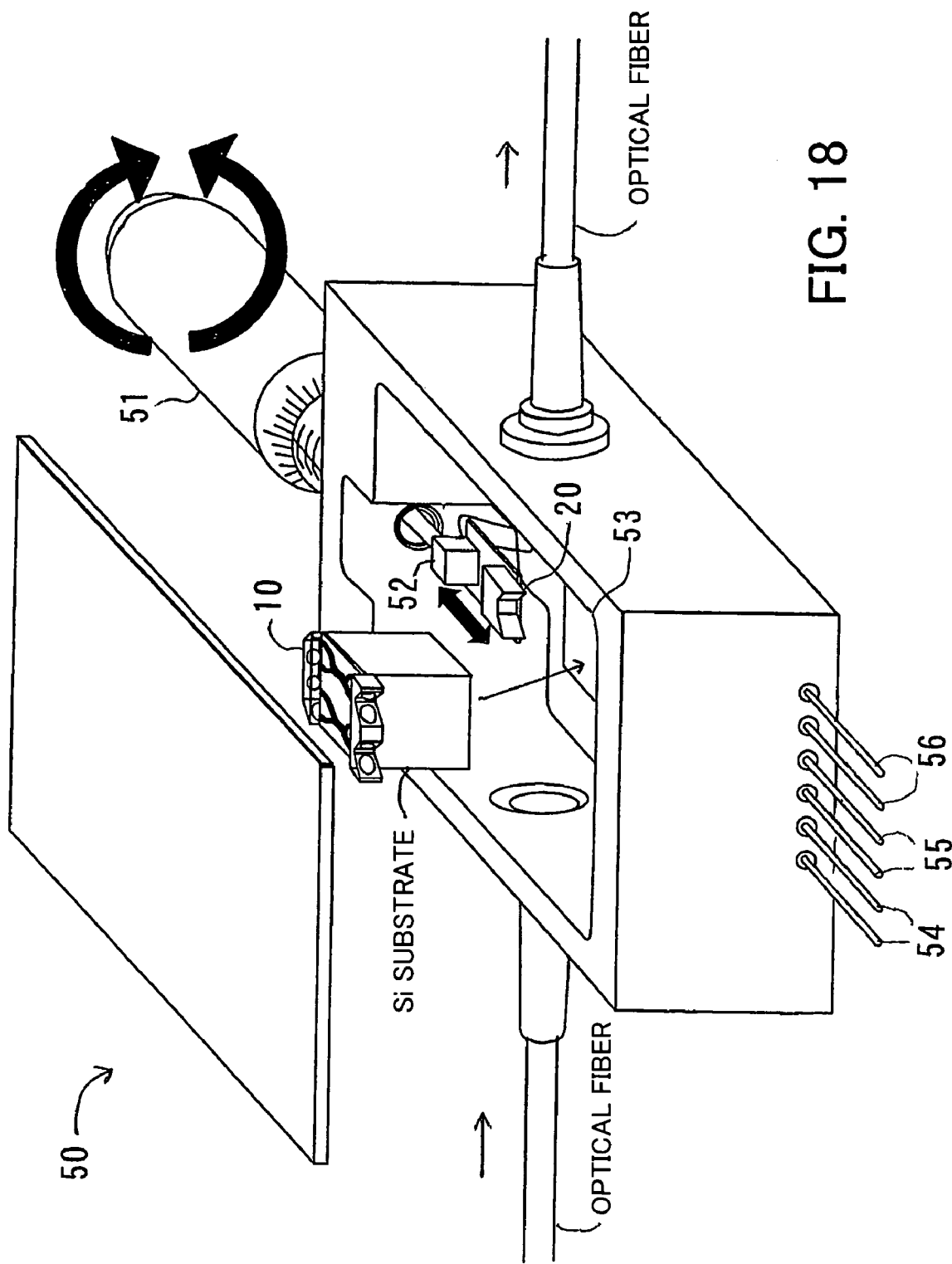
FIG. 18 is a perspective view of an example of a module containing a dispersion-slope compensator according to the present invention.

An example of module containing a dispersion-slope compensator according to the present invention is explained below with reference to FIG. 18, which is a perspective view of the module. In the dispersion-slope compensator 50 illustrated in FIG. 18, the optical-path substrate 10 and the movable MZI portion 20 are mounted on stages, and a micro-adjuster 51, a piezoelectric element 52, a ceramic heater 53, terminals 54 for activating the heaters, terminals 55 for monitoring temperature, terminals 56 for activating actuators, and optical fibers are arranged.

A PLC chip of the optical-path substrate 10 is mounted on the ceramic heater 53, which is provided for controlling the central wavelength. The position of the movable MZI portion 20 is coarsely controlled by the micro-adjuster 51, and finely controlled by the piezoelectric element 52. Therefore, the above construction enables variable setting of the optical length of an MZI arm. Thus, it is possible to set the amount of dispersion slope to an arbitrary value by using a single module.

Series Connection

Next, a multistage (series) connection of dispersion-slope compensators is explained below with reference to FIGS. 19 to 21. There is a trade-off between the amount of dispersion compensation and the transmission bandwidth in the dispersion-slope compensator 1 containing a single ring resonator as its base structure. Therefore, in consideration of this property, it is possible to connect in series a plurality of dispersion-slope compensators respective having different amounts of dispersion compensation and different central wavelengths.

Figure 19:
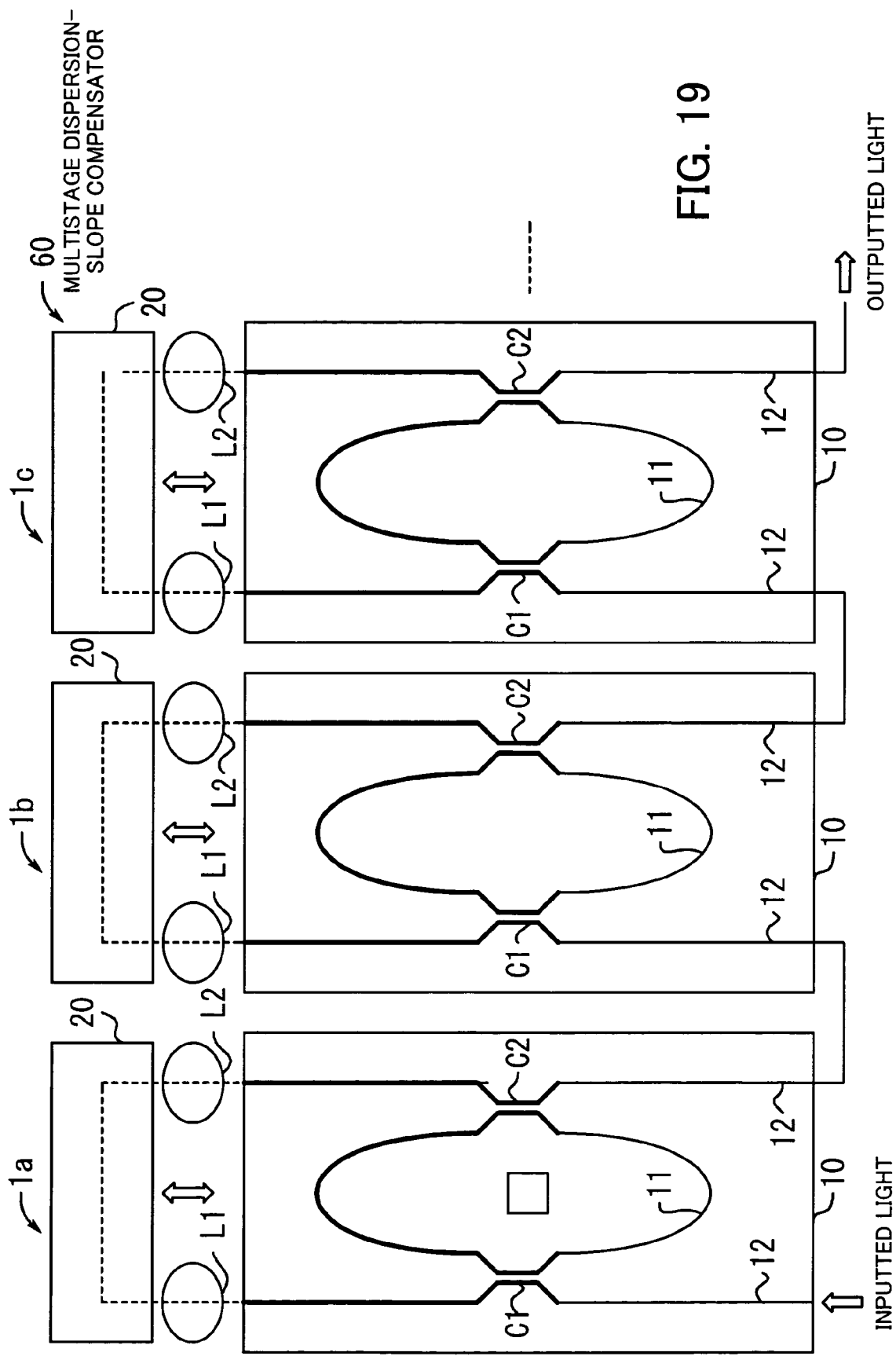
FIG. 19 is a diagram illustrating a multistage (series) connection of dispersion-slope compensators.

FIG. 19 is a diagram illustrating a multistage (series) connection of dispersion-slope compensators. In the multistage dispersion-slope compensator 60 illustrated in FIG. 19, dispersion-slope compensators 1a, 1b, 1c, . . . are connected in series by connecting the looped optical lines 11 in adjacent ones of the dispersion-slope compensators 1a, 1b, 1c, . . . . Since a plurality of dispersion-slope compensators are connected in series, it is possible to expand the compensation bandwidth. Alternatively, it is possible to form the optical-path substrates 10 of the plurality of dispersion-slope compensators as a single PLC.

Figure 20:
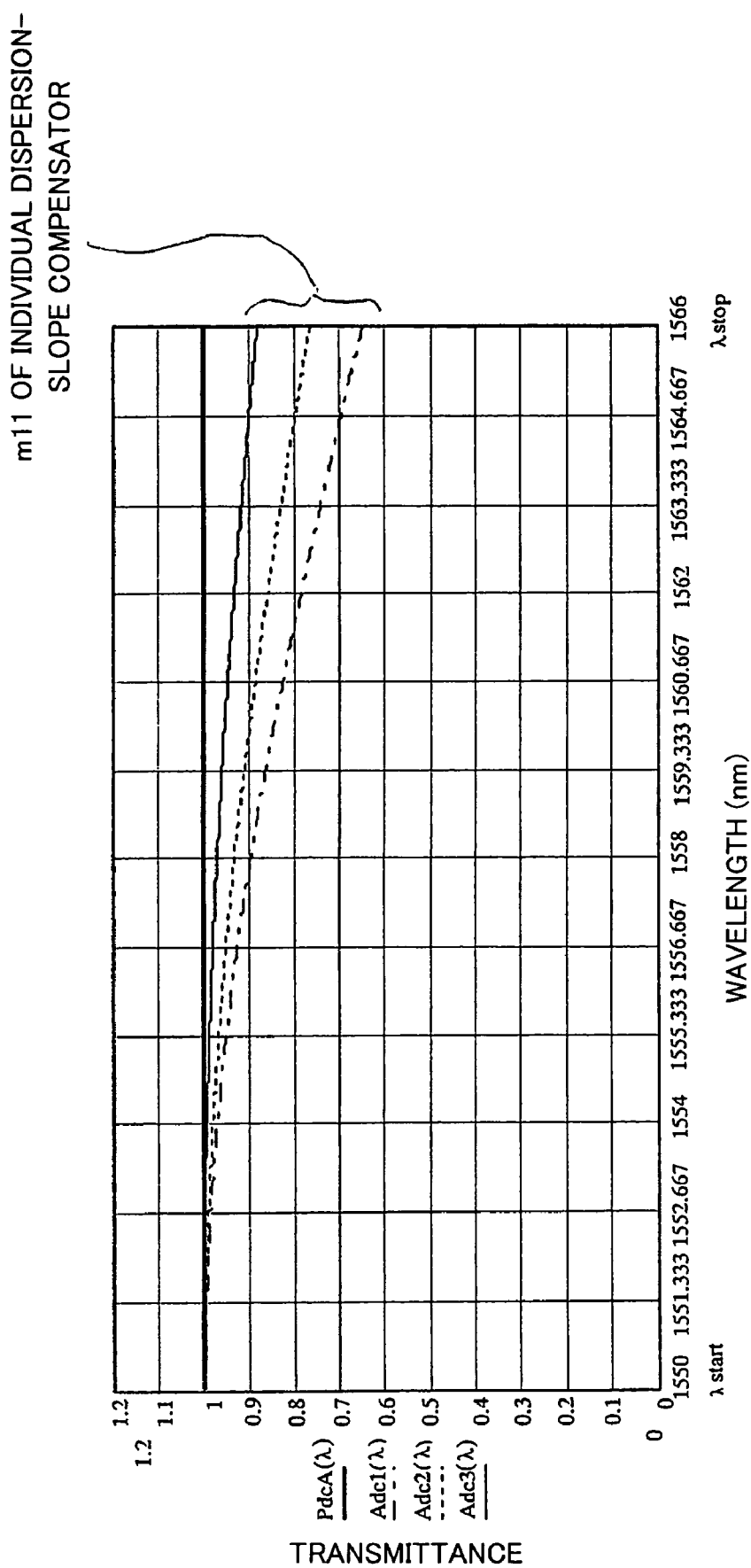
FIG. 20 is a graph indicating a wavelength dependence of the value $m_{11}$ in a three-stage construction for dispersion-slope compensation.
Figure 21:
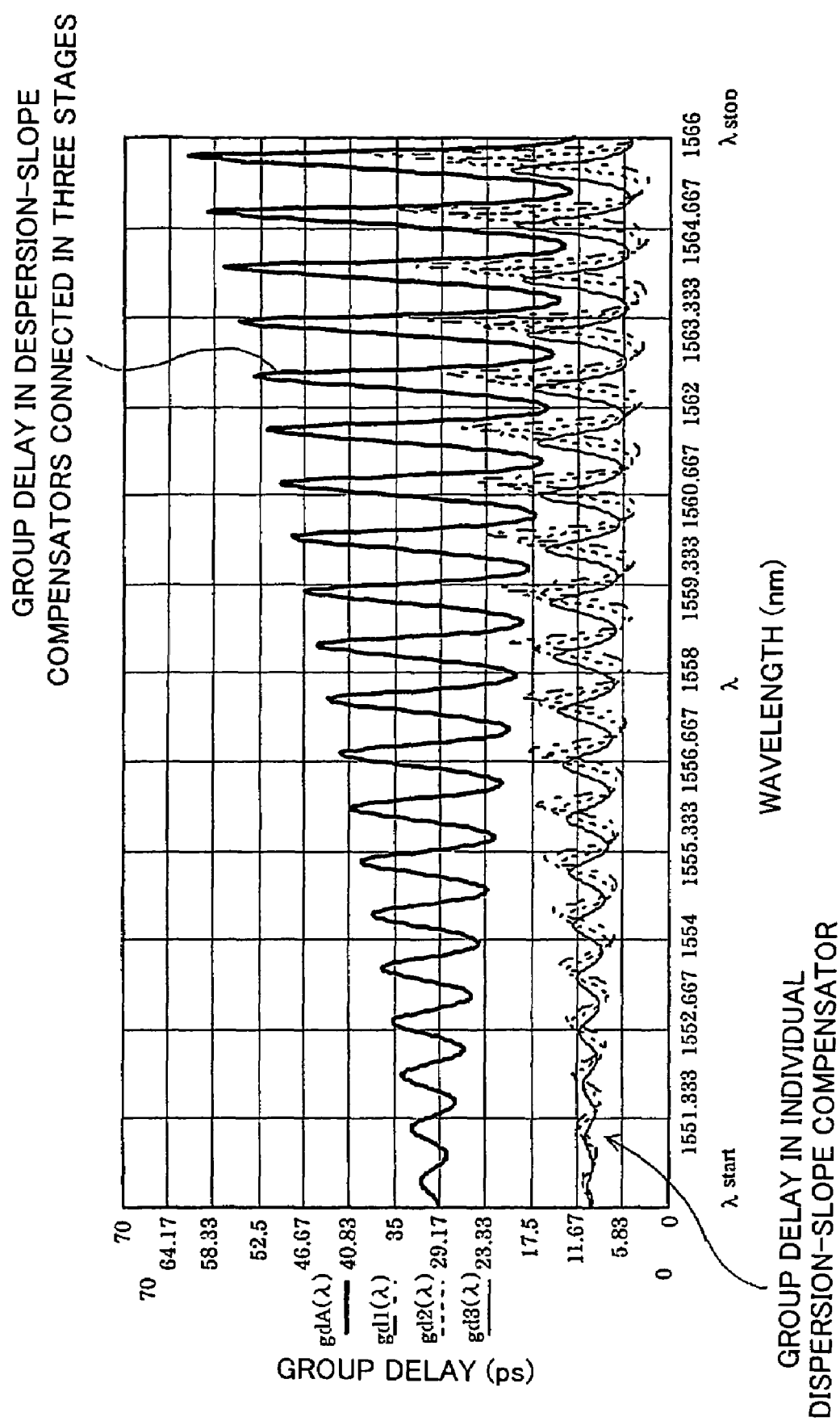
FIG. 21 is a graph indicating dispersion-slope-compensation the characteristic of the three-stage construction for dispersion-slope compensation.

FIG. 20 is a graph indicating the wavelength dependence of the value $m_{11}$ in the three-stage construction for dispersion-slope compensation, and FIG. 21 is a graph indicating the dispersion-slope-compensation characteristic of the three-stage construction for dispersion-slope compensation. In FIG. 20, the abscissa corresponds to the wavelength, and the ordinate corresponds to the transmittance. In FIG. 21, the abscissa corresponds to the wavelength, and the ordinate corresponds to the group delay. FIGS. 20 and 21 show results of simulations of dispersion-slope compensation over twenty, 100-GHz spaced channels. These results indicate that the dispersion-slope compensation of 7.3 ps/nm$^2$ in a 0.4 nm bandwidth can be performed by one operation for the twenty channels. FIG. 20 also shows the wavelength dependence of the value $m_{11}$ in each of the dispersion-slope compensators, and FIG. 21 indicates that the amount of dispersion slope increases when the three dispersion-slope compensators each having the characteristic shown in FIG. 20 are connected in series.

WDM System

Figure 22:
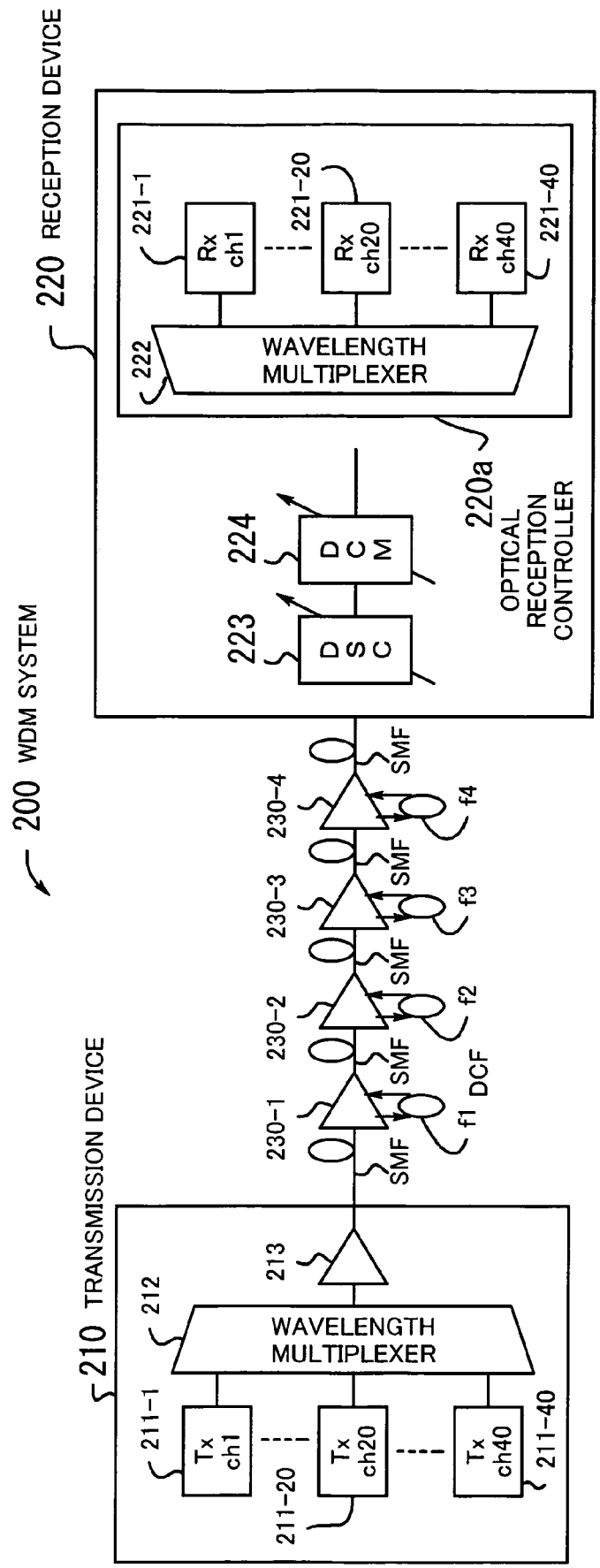
FIG. 22 is a diagram illustrating a WDM system according to the present invention.

Hereinbelow, a WDM system using a dispersion-slope compensator according to the present invention is explained with reference to FIGS. 22 and 23. FIG. 22 is a diagram illustrating a WDM system according to the present invention. The WDM system 200 illustrated in FIG. 22 comprises a transmission device 210, a reception device 220, and repeater amplifiers 230-1 to 230-4, and multiplexes at most forty wavelengths. In FIG. 22, only a construction for one-way transmission is indicated. In addition, each of the transmission device 210 and the reception device 220 respectively belongs to a station. Further, single mode fibers (SMFs) are used as optical fibers in the transmission line, and dispersion compensating fibers (DCFs) f1 to f4 are arranged for dispersion compensation.

The transmission device 210 comprises optical transmitters 211-1 to 211-40, a wavelength multiplexer 212, and a WDM amplifier 213. The reception device 220 comprises a dispersion-slope compensator (DSC) according to the present invention 223, a variable dispersion compensation module (variable DCM) 224, and an optical reception controller 220a, which is constituted by a wavelength demultiplexer 222 and optical receivers 221-1 to 221-40.

In the transmission device 210, the optical transmitters 211-1 to 211-40 respectively output optical signals in the channels ch1 to ch40. The wavelength multiplexer 212 multiplexes the optical signals in the channels ch1 to ch40 so as to generate a WDM signal. The WDM amplifier 213 amplifies the WDM signal, and outputs the amplified WDM signal onto the transmission line.

The repeater amplifiers 230-1 to 230-4 relay and amplify the WDM signal propagating through the SMFs. The dispersion compensating fibers (DCFs) f1 to f4 are adjusted to compensate for chromatic dispersion occurring in the channel ch20, so that the chromatic dispersion occurring (accumulated) in the optical signal in the channel ch20 is eliminated when the optical signal in the channel ch20 passes through each of the dispersion compensating fibers (DCFs) f1 to f4 in the repeater amplifiers 230-1 to 230-4.

In the reception device 220, the dispersion-slope compensator (DSC) 223 compensates for dispersion slope over all of the channels ch1 to ch40 by one operation. The variable DCM 224 compensates for dispersion remaining after the compensation for the dispersion slope. The wavelength demultiplexer 222 demultiplexes the WDM signal into forty waves in the channels ch1 to ch40. The optical receivers 221-1 to 221-40 perform processing for reception of the optical signals in the channels ch1 to ch40 in which the dispersion slope is already compensated for.

Figure 23A:
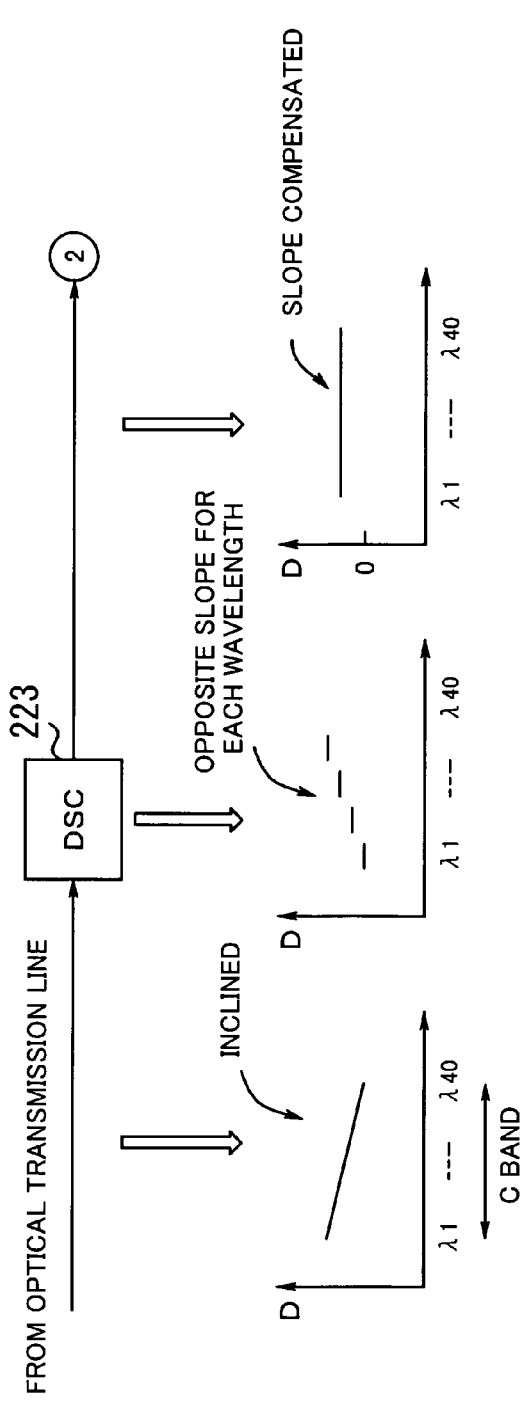
FIG. 23A is a diagram schematically illustrating the operation of compensating for the dispersion slope performed by dispersion-slope compensators.
Figure 23B:
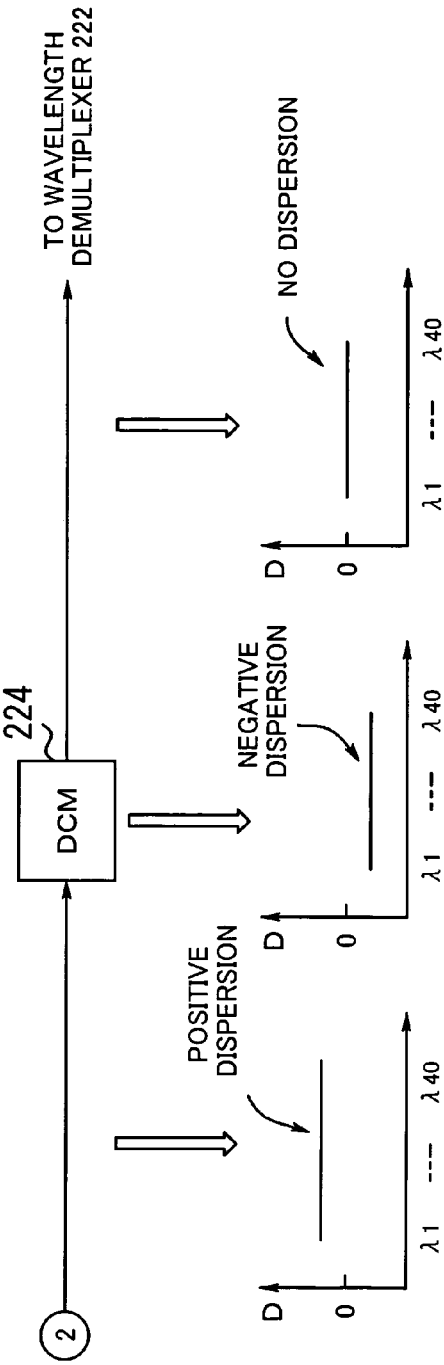
FIG. 23B is a diagram schematically illustrating the operation of compensating for the dispersion performed by a variable dispersion compensation module.

FIG. 23A is a diagram schematically illustrating the operation of compensating for the dispersion slope performed by the DSC 223, and FIG. 23B is a diagram schematically illustrating the operation of dispersion compensation performed by the variable DCM 224.

Figure 24:
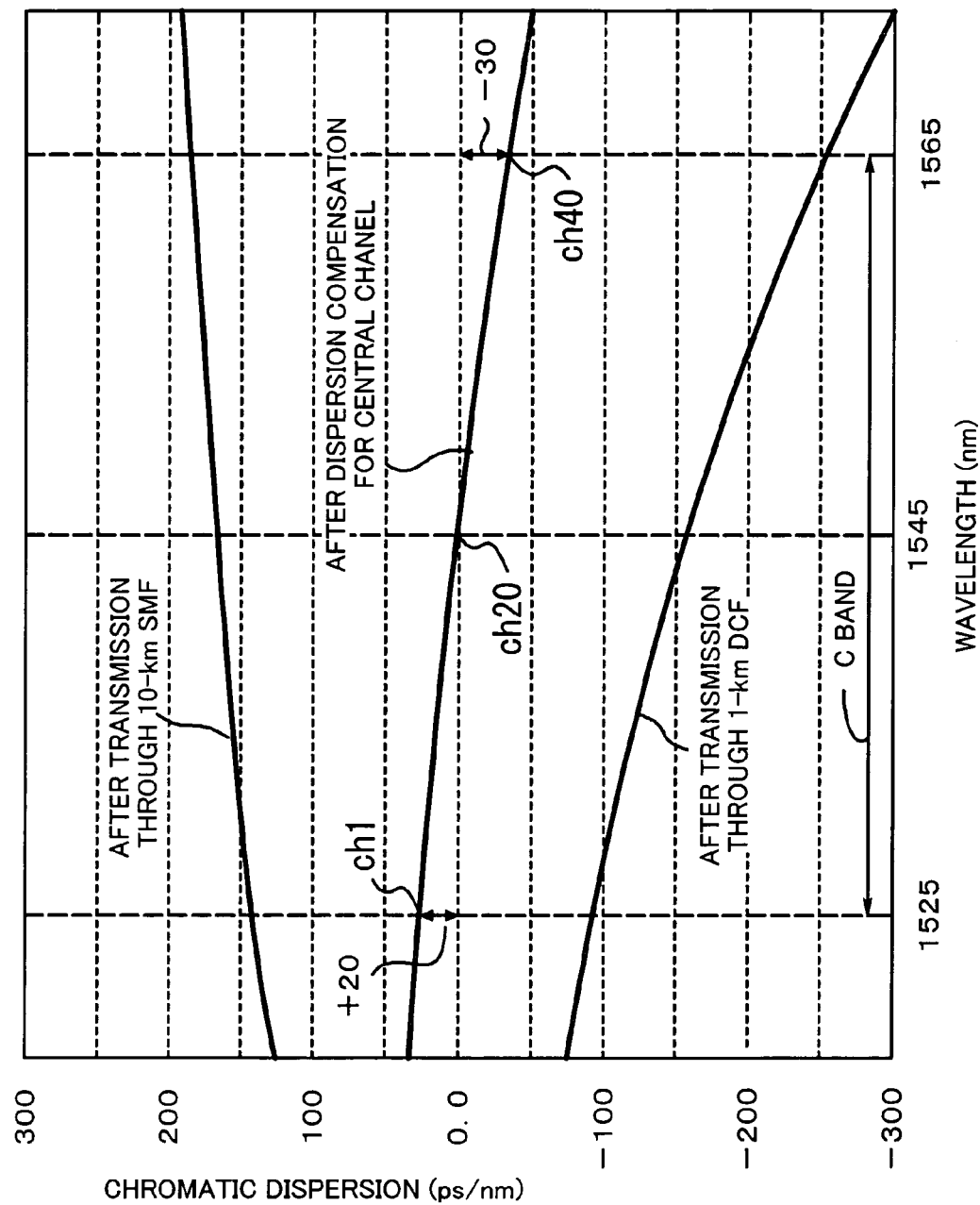
FIG. 24 is a graph indicating a residual dispersion.
Figure 25:
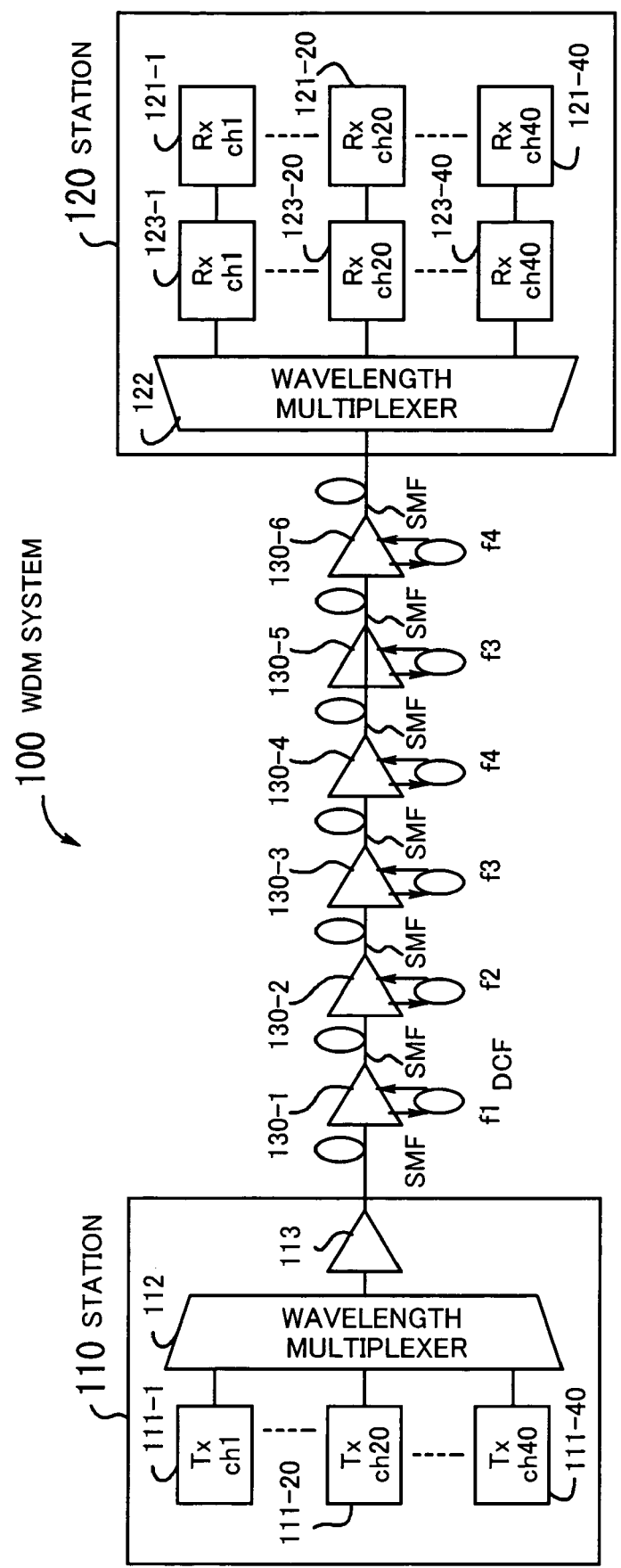
FIG. 25 is a diagram illustrating a conventional WDM system.
Figure 26:
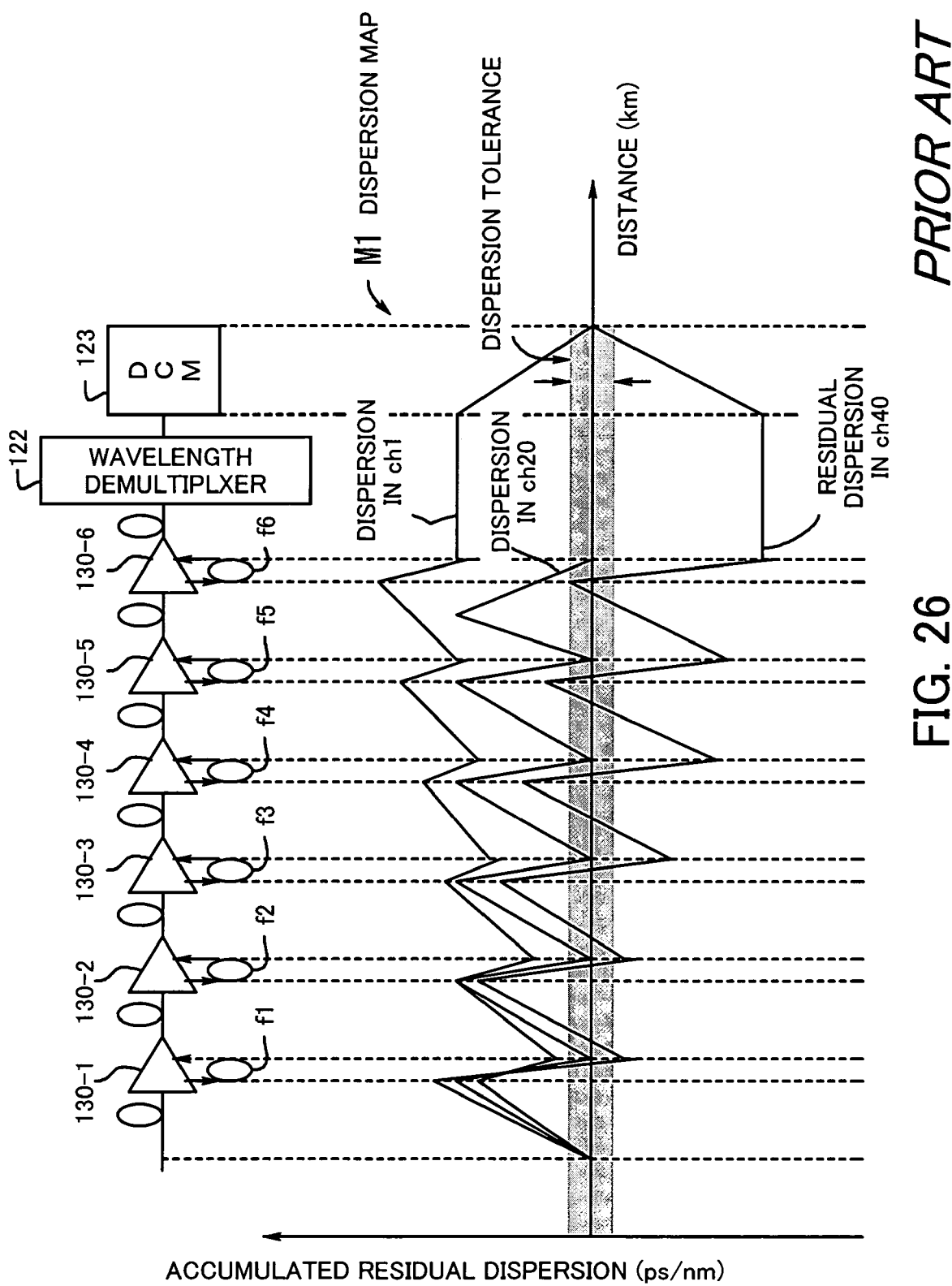
FIG. 26 is a dispersion map for the WDM system 100 illustrated in FIG. 25.

As illustrated in FIG. 23A, the DSC 223 compensate for the dispersion slope in the WDM signal received from the transmission line by filtering the WDM signal with a dispersion slope opposite to the dispersion slope in the WDM signal. (The dispersion slope in the WDM signal received from the transmission line indicates decrease in the chromatic dispersion with the wavelength as mentioned before with reference to FIG. 24.) Thus, the dispersion slope is eliminated (flat) in the output of the DSC 223.

As illustrated in FIG. 23B, the variable DCM 224 compensates for the dispersion remaining after the compensation for the dispersion slope by the DSC 223. Since a positive dispersion remains in the example illustrated in FIGS. 23A and 23B, the variable DCM 224 adds to the WDM signal a negative dispersion which is equal to the remaining dispersion in the magnitude. Thus, the chromatic dispersion remaining in the WDM signal (i.e., the accumulated chromatic dispersion) is eliminated in the output of the variable DCM 224.

As explained above, in the WDM system 200 according to the present invention, the dispersion slope over the channels in the WDM signal is compensated for by one operation performed by the single DSC 223, and thereafter the remaining dispersion is compensated for by one operation performed by the variable DCM 224. That is, it is unnecessary to provide dispersion compensators for respective channels as in the conventional WDM systems. Therefore, it is possible to reduce the equipment size, construct an economical network, and reduce the load imposed on the designer for dispersion management.

Advantages of the Invention

As explained before, in the dispersion-slope compensator according to the present invention, a portion of an MZI arm (optical path) constituting a Mach-Zehnder interferometer (MZI) is spatially separated from the other portions of the MZI arm so that the optical length of the MZI arm can be variably controlled, and the dispersion slope can be variably set, where the MZI is formed between two optical couplers in a feedback-type optical filter constituted by an looped optical line, an input-and-output optical line which inputs and outputs optical signals, and two or more optical couplers which include the above two optical couplers and couple the looped optical line and the input-and-output optical line. Therefore, it is possible to control the amount of compensation for dispersion slope in a sufficiently great range. Thus, high-precision dispersion compensation and improvement in the quality of optical transmission are enabled in a high-speed, large-capacity DWDM network.

In addition, when the dispersion-slope compensator according to the present invention is used in a DWDM system, it is possible to compensate for dispersion slope over all channels in the DWDM system by one operation performed by a single dispersion-slope compensator. That is, it is unnecessary to provide dispersion compensators for respective channels. Therefore, it is possible to reduce the cost of the DWDM system, and simplify the designing for dispersion management.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A dispersion slope compensator for compensating for dispersion slope which optical signals undergo, comprising:
   a substrate;
   a movable optical component disposed opposite to a side of the substrate to provide an optical path that guides a light emanating from one point on the side of the substrate to another point on the same, the movable optical component being movable in a perpendicular direction with respect to said side of the substrate;
   a looped optical line comprising an optical waveguide fabricated on the substrate;
   a variable-length input-and-output optical line formed from the optical path of the movable optical component and two optical waveguides fabricated on the substrate; and
   two optical couplers fabricated on the substrate to couple the looped optical line to the variable-length input-and-output optical line at two points.

2. The dispersion slope compensator according to claim 1, wherein the moveable component is one of a reflection prism, an optical fiber, and a planar lightwave circuit (PLC).

3. The dispersion slope compensator according to claim 1, further comprising condensing elements disposed between the movable optical component and the substrate.

4. The dispersion slope compensator according to claim 1, wherein the movable optical component can be positioned so that the variable-length input-and-output optical line and looped optical line are equal in terms of optical path lengths between the two optical couplers.

5. The dispersion slope compensator according to claim 1, further comprising a light-reflecting element fabricated at a side of the substrate for use as part of the variable-length input-and-output optical line or the looped optical line.

6. The dispersion slope compensator according to claim 1, further comprising a molded glass component adhered to a side of the substrate for use as part of the variable-length input-and-output optical line or the looped optical line.

7. The dispersion slope compensator according to claim 1, further comprising means for causing a change in refractive index at a portion of the looped optical line for adjustment of a central wavelength and an amount of dispersion compensation.

8. The dispersion slope compensator according to claim 1, wherein at least one of the two optical couplers is structured as a Mach-Zehnder interferometer so that an amount of dispersion compensation can be adjusted.

9. The dispersion slope compensator according to claim 1, wherein the movable optical component is moved by using one or a combination of a piezoelectric element, a microadjuster, and thermal expansion of a material.

10. The dispersion slope compensator according to claim 1, comprising a plurality of said substrate, movable optical component, looped optical line, variable-length input-and-output optical line, and optical couplers, arranged such that the variable-length input-and-output optical line will be connected in series.

11. An optical transmission system for transmitting optical WDM signals, comprising:
 (a) a transmission device which multiplexes optical signals into a WDM signal and transmits the WDM signal;
 (b) an optical transmission line and optical repeaters disposed thereon, being managed such that accumulated chromatic dispersion in a central channel will be eliminated at each repeater interval; and
 (c) a reception device, the reception device comprising:
  a dispersion slope compensator compensating for dispersion slope of the WDM signal received through the optical transmission line,
  a dispersion compensator compensating for chromatic dispersion in the WDM signal after the dispersion slope compensation, and
  an optical reception controller demultiplexing the received WDM signal back to individual optical signals;
 wherein said dispersion slope compensator comprises:
  a substrate;
  a movable optical component disposed opposite to a side of the substrate to provide an optical path that guides a light emanating from one point on the side of the substrated to another point on the same, the movable optical component being movable in a perpendicular direction with respect to said side of the substrate;
  a looped optical line comprising an optical waveguide fabricated on the substrate;
  a variable-length input-and-output optical line formed from the optical path of the movable optical component and two optical waveguides fabricated on the substrate; and
  two optical couplers disposed on the substrate to couple the looped optical line to the variable-length input-and-output optical line at two points.

12. A dispersion slope compensator for compensating for dispersion slope which optical signals undergo, comprising:
 a substrate;
 a movable optical component disposed opposite to a side of the substrate to provide an optical path that guides a light emanating from one point on the side of the substrate to another point on the same, the movable optical component being movable in a perpendicular direction with respect to said side of the substrate;
 a variable-length looped optical line formed from the optical path of the movable optical component and an optical waveguide fabricated on the substrate;
 an input-and-output optical line comprising an optical waveguide fabricated on the substrate; and
 two optical couplers fabricated on the substrate to couple the variable-length looped optical line to the input-and-output optical line at two points.

* * * * *